(12) United States Patent
Simmons

(10) Patent No.: US 11,659,838 B2
(45) Date of Patent: May 30, 2023

(54) QUAT-FREE POWDERED DISINFECTANT/SANITIZER

(71) Applicant: Sterilex, LLC, Hunt Valley, MD (US)

(72) Inventor: Ryan Alexander Simmons, Baltimore, MD (US)

(73) Assignee: Sterilex, LLC, Hunt Valley, MD (US)

( * ) Notice: Subject to any disclaimer, the term of this patent is extended or adjusted under 35 U.S.C. 154(b) by 0 days.

(21) Appl. No.: 17/711,643

(22) Filed: Apr. 1, 2022

(65) Prior Publication Data

US 2022/0322675 A1 Oct. 13, 2022

Related U.S. Application Data

(60) Provisional application No. 63/170,176, filed on Apr. 2, 2021, provisional application No. 63/169,609, filed on Apr. 1, 2021.

(51) Int. Cl.
*A01N 59/00* (2006.01)
*A01N 25/14* (2006.01)
*A01N 25/30* (2006.01)
*A01P 1/00* (2006.01)

(52) U.S. Cl.
CPC ............. *A01N 59/00* (2013.01); *A01N 25/14* (2013.01); *A01N 25/30* (2013.01); *A01P 1/00* (2021.08)

(58) Field of Classification Search
CPC ........ A01N 59/00; A01N 25/14; A01N 25/30; A01P 1/00
See application file for complete search history.

(56) References Cited

U.S. PATENT DOCUMENTS

| | | | |
|---|---|---|---|
| 5,624,891 A | 4/1997 | Smialowicz et al. |
| 5,871,590 A | 2/1999 | Hei et al. |
| 6,087,319 A | 7/2000 | Norman |
| 6,159,916 A | 12/2000 | Robbins et al. |
| 6,387,871 B2 | 5/2002 | Faber |
| 6,498,134 B1 | 12/2002 | Scheibel et al. |
| 6,506,717 B1 | 1/2003 | Kott et al. |
| 6,548,467 B2 | 4/2003 | Baker et al. |
| 6,565,804 B1 | 5/2003 | Conway |
| 6,908,894 B2 | 6/2005 | Kott et al. |
| 7,241,433 B2 | 7/2007 | Jakob et al. |
| 7,291,276 B1 | 11/2007 | Zahn |
| 7,338,564 B2 | 3/2008 | Garner et al. |
| 7,399,365 B2 | 7/2008 | Aoyama et al. |
| 7,470,331 B1 | 12/2008 | van Buskirk et al. |
| 7,923,417 B2 | 4/2011 | Sanders et al. |
| 7,928,040 B2 | 4/2011 | Sanders et al. |
| 7,939,486 B2 | 5/2011 | Scheuing et al. |
| 8,034,758 B2 | 10/2011 | Soentgerath et al. |
| 8,097,577 B2 | 1/2012 | Danziger et al. |
| 8,143,209 B2 | 3/2012 | Boeckh et al. |
| 8,143,309 B2 | 3/2012 | Awad et al. |
| 8,267,176 B2 | 9/2012 | Nguyen et al. |
| 8,361,409 B2 | 1/2013 | Rico et al. |
| 8,415,278 B2 | 4/2013 | Sanders et al. |
| 8,450,261 B2 | 5/2013 | Nakano et al. |
| 8,535,392 B2 | 9/2013 | Hong et al. |
| 8,546,449 B2 | 10/2013 | Harvey et al. |
| 8,586,523 B2 | 11/2013 | Dupont et al. |
| 8,637,088 B2 | 1/2014 | Scheuing et al. |
| 8,673,365 B2 | 3/2014 | Wang et al. |
| 8,921,298 B2 | 12/2014 | Tyborski |
| 9,204,655 B2 | 12/2015 | Stevenson et al. |
| 9,394,092 B2 | 7/2016 | Lee et al. |
| 9,404,070 B2 | 8/2016 | Lant et al. |
| 9,550,965 B2 | 1/2017 | Hulskotter et al. |
| 9,603,359 B2 | 3/2017 | Joshi |
| 9,624,119 B2 | 4/2017 | Dotzauer et al. |
| 9,700,644 B2 | 7/2017 | Kaiser et al. |
| 9,701,931 B2 | 7/2017 | Moore |
| 9,701,952 B2 | 7/2017 | Schnorr et al. |
| 9,724,550 B2 | 8/2017 | Kaiser et al. |
| 9,783,766 B2 | 10/2017 | Dotzauer et al. |
| 9,856,466 B2 | 1/2018 | Amin et al. |
| 9,908,675 B2 | 3/2018 | Lee et al. |
| 9,909,109 B2 | 3/2018 | Skjold-Joergensen et al. |
| 9,918,467 B2 | 3/2018 | Joshi |
| 10,010,090 B2 | 7/2018 | Lauzon |
| 10,053,653 B2 | 8/2018 | Fu et al. |
| 10,155,920 B1 | 12/2018 | Mossoba et al. |
| 10,176,979 B2 | 1/2019 | Liu et al. |
| 10,183,187 B2 | 1/2019 | Li |
| 10,244,762 B1 | 4/2019 | Lei et al. |
| 10,246,692 B2 | 4/2019 | Olinski et al. |
| 10,260,030 B2 | 4/2019 | Joshi |
| 10,336,973 B2 | 7/2019 | Labeque et al. |
| 10,426,854 B2 | 10/2019 | Matta et al. |
| 10,441,823 B2 | 10/2019 | Tsaur et al. |
| 10,487,297 B2 | 11/2019 | Moore |

(Continued)

FOREIGN PATENT DOCUMENTS

| | | |
|---|---|---|
| CA | 2298948 A1 | 5/2000 |
| CA | 2299584 A1 | 5/2000 |

(Continued)

OTHER PUBLICATIONS

Technical Information Bulletin on Dehypon® GRA. Downloaded Jun. 23, 2022 from: https://assets.websitefiles.com/5fc9222730707183b6adc32a/60ad1527e4d047bc44bd5b32_Dehypon-GRA-30538098.pdf. Available on the web 2014. (Year: 2014).*

(Continued)

*Primary Examiner* — Michael P Cohen
(74) *Attorney, Agent, or Firm* — Frost Brown Todd LLP

(57) ABSTRACT

Quat-free surface treatment powders comprising a peroxide source, an acyl group donor and an alkalinity source are used to disinfect and/or sanitize hard surfaces. The surface treatment powders can be applied to a hard surface and left there for a period of time. The surface treatment powders are ambient moisture activated, which means that they can generate peracetic acid when a portion or all of the powder that is on the hard surface adsorbs water from the atmosphere. In addition or alternatively, the surface treatment powders are activated, i.e., generate peracetic acid through the incidental or purposeful addition of liquid thereto.

22 Claims, 6 Drawing Sheets

(56) References Cited

U.S. PATENT DOCUMENTS

| | | | |
|---|---|---|---|
| 10,555,521 | B2 | 2/2020 | Joshi |
| 10,557,106 | B2 | 2/2020 | Dotzauer et al. |
| 10,687,536 | B2 | 6/2020 | Joshi |
| 10,696,460 | B2 | 6/2020 | Lee et al. |
| 10,808,211 | B2 | 10/2020 | Joshi |
| 10,836,732 | B2 | 11/2020 | Hallenbach et al. |
| 2003/0096720 | A1 | 5/2003 | Huth et al. |
| 2003/0100464 | A1 | 5/2003 | Kott et al. |
| 2003/0198605 | A1 | 10/2003 | Montgomery |
| 2003/0206964 | A1 | 11/2003 | Larose |
| 2005/0026802 | A1 | 2/2005 | Kilkenny et al. |
| 2005/0079987 | A1 | 4/2005 | Cartwright et al. |
| 2005/0159328 | A1 | 7/2005 | Oberlander et al. |
| 2006/0039840 | A1 | 2/2006 | Chia et al. |
| 2006/0039841 | A1 | 2/2006 | Rico et al. |
| 2006/0070189 | A1 | 4/2006 | Raehse et al. |
| 2006/0120987 | A1 | 6/2006 | Panzer et al. |
| 2006/0258535 | A1 | 11/2006 | Larose |
| 2007/0197416 | A1 | 8/2007 | Pegelow et al. |
| 2007/0225186 | A1 | 9/2007 | Fisher |
| 2009/0032063 | A1 | 2/2009 | Haas et al. |
| 2009/0133716 | A1 | 5/2009 | Lee |
| 2009/0148342 | A1 | 6/2009 | Bromberg et al. |
| 2010/0022431 | A1 | 1/2010 | Lant et al. |
| 2011/0152133 | A1 | 6/2011 | Sanders et al. |
| 2012/0297551 | A1 | 11/2012 | Grande et al. |
| 2013/0052342 | A1 | 2/2013 | Stevenson et al. |
| 2013/0165525 | A1 | 6/2013 | Scheuing et al. |
| 2013/0171264 | A1 | 7/2013 | Finan et al. |
| 2013/0210695 | A1 | 8/2013 | Bjelopavlic et al. |
| 2014/0039051 | A1* | 2/2014 | Strodtholz ........... C11D 3/3917 134/42 |
| 2014/0096467 | A1 | 4/2014 | Norton |
| 2014/0296127 | A1 | 10/2014 | Hulskotter et al. |
| 2015/0093425 | A1* | 4/2015 | Moore ................. C11D 11/0041 424/408 |
| 2015/0353870 | A1 | 12/2015 | Lant |
| 2016/0066580 | A1 | 3/2016 | Stevenson et al. |
| 2016/0270389 | A1 | 9/2016 | Glasbey |
| 2016/0351388 | A1 | 12/2016 | Liu et al. |
| 2017/0215412 | A2 | 8/2017 | Glasbey |
| 2017/0215415 | A1 | 8/2017 | Reay |
| 2017/0298304 | A1* | 10/2017 | Vesterager ............... C11D 3/06 |
| 2017/0335307 | A1 | 11/2017 | Toscano et al. |
| 2018/0094212 | A1 | 4/2018 | Chieffi et al. |
| 2018/0094223 | A1 | 4/2018 | Chieffi et al. |
| 2018/0094226 | A1 | 4/2018 | Chieffi et al. |
| 2018/0100128 | A1 | 4/2018 | Park et al. |
| 2018/0105773 | A1* | 4/2018 | Fu ........................... C11D 1/62 |
| 2018/0230405 | A1 | 8/2018 | Kneer et al. |
| 2018/0230413 | A1 | 8/2018 | Joshi |
| 2018/0272386 | A1 | 9/2018 | McAlpin et al. |
| 2018/0343859 | A1 | 12/2018 | Jiang et al. |
| 2018/0371371 | A1 | 12/2018 | Daeschlein et al. |
| 2019/0002802 | A1 | 1/2019 | Daeschlein et al. |
| 2019/0071621 | A1 | 3/2019 | Glasbey et al. |
| 2019/0085241 | A1 | 3/2019 | Liu et al. |
| 2019/0088492 | A1 | 3/2019 | Liu et al. |
| 2019/0144781 | A1 | 5/2019 | Daeschlein et al. |
| 2019/0185791 | A1 | 6/2019 | Murphy |
| 2019/0203159 | A1 | 7/2019 | Dotzauer et al. |
| 2019/0224355 | A1 | 7/2019 | Medivators |
| 2020/0181536 | A1 | 6/2020 | Chen et al. |
| 2020/0205414 | A1 | 7/2020 | Limaye et al. |
| 2020/0331678 | A1 | 10/2020 | Lee et al. |

FOREIGN PATENT DOCUMENTS

| | | | |
|---|---|---|---|
| CA | | 2569025 A1 | 6/2008 |
| CA | | 3082443 A1 | 5/2019 |
| CN | | 103155944 A | 6/2013 |
| CN | | 104364364 A | 2/2015 |
| CN | | 104621180 A | 5/2015 |
| DE | | 102004010152 A1 | 9/2005 |
| EP | | 0428034 B1 | 4/1995 |
| EP | | 0552193 B1 | 10/1995 |
| EP | | 0427314 B1 | 12/1995 |
| EP | | 0618960 B1 | 7/1996 |
| EP | | 0737738 B1 | 6/2003 |
| EP | | 1064845 B1 | 9/2003 |
| EP | | 1228190 B1 | 3/2006 |
| EP | | 1065265 B1 | 9/2008 |
| EP | | 3596194 A1 | 1/2020 |
| EP | | 2970823 A1 | 6/2021 |
| WO | WO 1994/026858 A1 | | 11/1994 |
| WO | WO 1999/000474 A1 | | 1/1999 |
| WO | WO 2000/043474 A2 | | 7/2000 |
| WO | WO 2000/043479 A1 | | 7/2000 |
| WO | WO 2001/083659 A1 | | 11/2001 |
| WO | WO 2009/122125 A1 | | 10/2009 |
| WO | WO 2015/189566 A1 | | 12/2015 |
| WO | WO 2016/069576 A1 | | 5/2016 |
| WO | WO 2016/161253 A1 | | 10/2016 |
| WO | WO 2018/184767 A1 | | 10/2018 |
| WO | WO 2019/086520 A1 | | 5/2019 |

OTHER PUBLICATIONS

ASTM E1153-14. "Standard Test Method For Efficacy Of Sanitizers Recommended For Inanimate, Hard, Nonporous Non-food Contact Surfaces." (2014).

"Protocol for Residual Self-Sanitizing Activity of Dried Chemical Residues on Hard Nonporous Surfaces" available at https://www.epa.gov/sites/default/files/2015-09/documents/cloroxpcol_final.pdf, printed on Sep. 13, 2022, 22 pages.

US Environmental Protection Agency Office of Pesticide Programs, "AOAC Use Dilution Method for Testing Disinfectants (Date revised Jan. 17, 2020)", 19 pages.

International Search Report and Written Opinion dated Dec. 7, 2022 for International Application No. PCT/US2022/023085, 16 pages.

* cited by examiner

QUAT-FREE POWDERED DISINFECTANT/SANITIZER

CROSS-REFERENCE TO RELATED APPLICATION

This application claims priority to and the benefit of U.S. Patent Application No. 63/169,609, entitled "Quat-Free Powdered Disinfectant/Sanitizer," which was filed on Apr. 1, 2021, and to U.S. Patent Application No. 63/170,176, entitled "Quat-Free Powdered Disinfectant/Sanitizer," which was filed on Apr. 2, 2021. The contents of the aforementioned applications are incorporated herein in their entirety for all purposes.

BACKGROUND

Surface treatment compositions for use on non-food contact and food contact surfaces are known. Effective surface treatment compositions that have the capacity to disinfect and/or sanitize ("disinfect/sanitize") surfaces in addition, or in alternative to, being used to clean surfaces, are especially useful in environments that are vulnerable to microbial contamination. Such environments may include, but are not limited to, surfaces in the food and beverage industry (e.g., food and beverage processing facilities), in dairies, on farms (e.g., poultry farms, swine farms, hatcheries), in animal health care environments (e.g., veterinarian offices) and in human health care environments (e.g., doctor's offices, hospitals).

Powdered surface treatment compositions that disinfect/sanitize are known in the industry, but are less common than liquid ones, which can be easier to dilute and/or apply. Some known surface treatment powders require dilution in water prior to application to a surface to be treated. Other known surface treatment powders are applied dry and allowed to reside on a surface to be treated over a period of time. To effectively treat the surface to which such a surface treatment powder has been applied, active ingredients in the powder must be contacted with liquid, which can occur incidentally, e.g., via spills and/or purposefully, through the addition of liquid to the surface treatment powder and/or to the surface on which it resides including, but not limited to water that is used in processing, during cleaning, disinfection and/or sanitizing, etc.

As noted above, a common use of surface treatment powders is to clean, disinfect and/or sanitize food contact surfaces, floors, drains, entryways, shoes/boots of workers, etc., in facilities associated with the food and beverage industry (including bakeries), dairies, animal health, human health and farms. In these facilities, a surface treatment powder may be spread on the floor, around a drain, in an entryway, etc., and the active ingredients in the powder are eventually activated by incidental liquid that is introduced on the floor and/or are activated by liquid that is delivered intentionally to the powder and/or to the floor, drain, entryway, etc., during operations. In these environments, surface treatment powders may impart additional benefits by providing improved traction, since the presence of non-spherical granular and/or powder material may increase friction on floors that are wet or onto which organic matter has spilled. The presence of surface treatment powders on the aforementioned surfaces may impart the further benefit of visually indicating that treatment is occurring in specific areas. However, since most commercially available surface treatment powders are white or off-white due to lack of stability of colorants added thereto, they may easily be confused with other substances used in a facility, for example where powdered processing components and/or food ingredients are present (e.g., flour, sugar, baking powder, baking soda, salt etc.).

Some known powdered disinfectant and/or sanitizer ("disinfectant/sanitizer") compositions incorporate a quaternary ammonium compound ("quat") or quaternary ammonium compounds ("quats"), such as those quats that are described in U.S. Pat. No. 10,053,653 (Fu, et al.). Quats are potent and broad-spectrum antimicrobial agents that have been in extensive use for decades. However, due to their positively charged nature, the presence of quats in liquid or powdered disinfectant/sanitizer compositions may present several undesirable consequences.

Notably, the presence of positively charged quats in disinfectant/sanitizer compositions may have an affinity to adsorb onto the surfaces being treated, which may render it difficult to remove the compositions from the treated surfaces, such as by rinsing. The tendency of quats to leave residuals is well documented. Quats are positively charged molecules and are attracted to negatively charged surface environments that may be prevalent in a variety of facilities, including throughout food and beverage processing facilities.

Quats are widely used in many market segments, including disinfection applications. However, there has been recent market and regulatory pressure to reduce and even eliminate the use of quats, particularly in food and beverage processing facilities. For example, in October of 2014, the European Commission set Maximum Residue Levels (MRLs) in the food processing industry for two quats, benzalkonium chloride (BAC) and didecyldimethylammonium chloride (DDAC), which are commonly used as antimicrobial agents in food processing facilities (EU Regulation 396/2005). The EU regulation reduces the MRL from 0.5 mg/kg (500 ppm) to 0.1 mg/kg (100 ppm) for both BAC and DDAC quats.

There is some evidence that rinsing a food contact surface prior to processing reduces quat levels in food below the Maximum Residual Limits ("the MRL") in the European Union ("EU"). However, residual levels in these industries must be tested, which can be both expensive and time consuming. Consequently, MRL regulations have evolved into a de-facto "quat ban" in the EU since the use of certain quats (e.g., DDAC and BAC) is likely to leave residuals on surfaces, and the need to test surfaces may be seen as a burden. In addition to processors in the EU, companies exporting to the EU may also be asked to certify that their products are below the European MRL requirements, leading to similar onerous testing requirements to allow for international commerce. Some large multinational corporations have also internally banned the use of certain quats in their food and beverage processing facilities, likely with an eye towards complying with the EU regulations.

In addition to regulatory concerns, the tendency of quats to leave residues on treated surfaces may have an impact on systems in other food and beverage related settings. For example, in cultured dairy facilities, there may be a reluctance to utilize quat containing disinfectant/sanitizer compositions due to their destructive impact on starter cultures, which are critical elements in the production of leavened baked goods, alcoholic beverages (e.g., beer, wine, spirits etc.) and cultured dairy products (e.g., sour cream, cottage cheese etc.).

Some industries also view quats as a potential risk to their anaerobic wastewater treatment. For example, anaerobic wastewater treatment plants rely on anaerobic bacteria to assist in the water treatment process. Any anaerobic wastewater treatment plants that disinfect/sanitize with quat containing compositions may run the risk of killing the very anerobic bacteria that they rely upon. Moreover, any quats that contaminate effluent in these or other settings may not be freely released into the ground due to regulatory limitations.

Accordingly, some disinfectant/sanitizer compositions do not rely upon quats to disinfect/sanitize surfaces. For example, U.S. Pat. No. 8,546,449 (Harvey, et al.), utilizes a liquid peracetic acid (PAA) composition to disinfect/sanitize hard surfaces. Noting that there are several problems with the use of equilibrium solutions of PAA, Harvey et al. describes in situ production of peracetic acid (PAA) by mixing a hydrogen peroxide-triacetin solution with an aqueous source of an alkali or earth alkali metal. Harvey et al. further indicates that the pH of the PAA solutions that are made using the compositions and methods described therein are alkaline, having a pH of about 11.2 to about 13.37. Harvey et al. also discloses free-flowing solid compositions that generate PAA when added to water. The solid compositions comprise a liquid acetyl precursor, a water-soluble source of hydrogen peroxide and a water-soluble source of alkalinity, and are described as being useful as a bleaching agent and stain remover for the treatment of fabrics, dentures, textile garments and equipment used in the food and beverage industry. When treating laundry swatches in 104° F. water using an exemplary free-flowing solid composition, the water also had an initial pH of 11.2.

For these and other reasons, a need remains for effective, powdered disinfectant/sanitizers compositions that minimize issues with residual deposits forming on treated surfaces, contamination of products and articles that come into contact with treated surfaces, and that also comply with the regulatory landscape. It would also be desirable to formulate such disinfectant/sanitizer compositions so that they have broad utility, including, but not limited to, utility in the food and beverage industries (e.g., in food and beverage processing facilities) and in dairies. It would also be desirable to formulate such disinfectant/sanitizer compositions in a form that is antimicrobial in a variety of environments, ranging from wet to dry. It would be beneficial if such disinfectant/sanitizer compositions could be used in facilities that require a very dry environment (i.e., having very low ambient humidity, produce low moisture products where water presents a spoilage concern) such as facilities in which dry foodstuffs (e.g., flour, sugar, cereal, nuts, baking powder, baking soda, etc.) are used or made. It would be beneficial if such disinfectant/sanitizer compositions could also be useful on farms (e.g., poultry farms, swine farms, hatcheries), and in animal and human health care environments (e.g., veterinary clinics, doctors' offices, hospitals). It would also be beneficial if such disinfectant/sanitizer compositions could be used to treat a wide range of hard surfaces in these settings including, but not limited to, floors (e.g., in plants and dairies; in cracks and crevices), around trash disposal areas, construction project barriers, in, around and/or on drains, entryways (e.g., doorways, thresholds, etc.), shoes and boots worn by workers (via foot pans and/or foot mats for example) and tracks, treads and/or wheels of various equipment or machinery, in and around animal housing (e.g., poultry and swine premises), and could, depending upon where the compositions are located, prevent cross-contamination between areas and or zones (e.g., prevent cross-contamination between rooms, across doorways, across thresholds, etc.). It would also be useful if such disinfectant/sanitizer compositions after being applied to a hard surface, would be activated by the ambient humidity as well as through the purposeful and/or incidental addition of liquid thereto. It would further be beneficial if the components of the non-activated portions of the disinfectant/sanitizer compositions were characterized by a pH that remained stable even after activation by ambient moisture and/or liquid, such that generation of actives, e.g., PAA, would occur over time rather than plummeting after quickly reaching a maximum yield. It would further be beneficial if actives were not activated in portions of the disinfectant/sanitizer compositions that have yet been contacted with ambient moisture and/or liquid.

While a variety of compositions and methods for disinfecting and/or sanitizing ("disinfecting/sanitizing") surfaces have been made and used, it is believed that no one prior to the inventors has made or used an invention as described herein.

BRIEF SUMMARY

In general, the present disclosure is directed to powdered disinfectant/sanitizer compositions that are quat-free, as well as methods of disinfecting/sanitizing hard surfaces without relying upon the use of quats.

Exemplary hard surface treatment powders comprise a peroxide source, an acyl group donor and an alkalinity source. Some exemplary hard surface treatment powders are flowable, ambient moisture activatable, substantially free of one or more quaternary ammonium compounds, and formulated to have an initial localized pH greater of about 7.0 to about 10.5 and to maintain the initial localized pH when dissolved in whole or in part by water.

Exemplary methods of treating a hard surface comprise applying an exemplary hard surface treatment powder to a hard surface. Some exemplary methods include: cleaning the hard surface; sanitizing the hard surface; disinfecting the hard surface; sterilizing the hard surface; and combinations thereof. In some exemplary methods, the hard surface to be treated is footwear, and the methods comprise placing the surface treatment powder in a foot pan.

BRIEF DESCRIPTION OF THE DRAWINGS

It is believed that the present invention will be better understood from the following description of certain examples taken in conjunction with the accompanying drawings.

Figure 1:
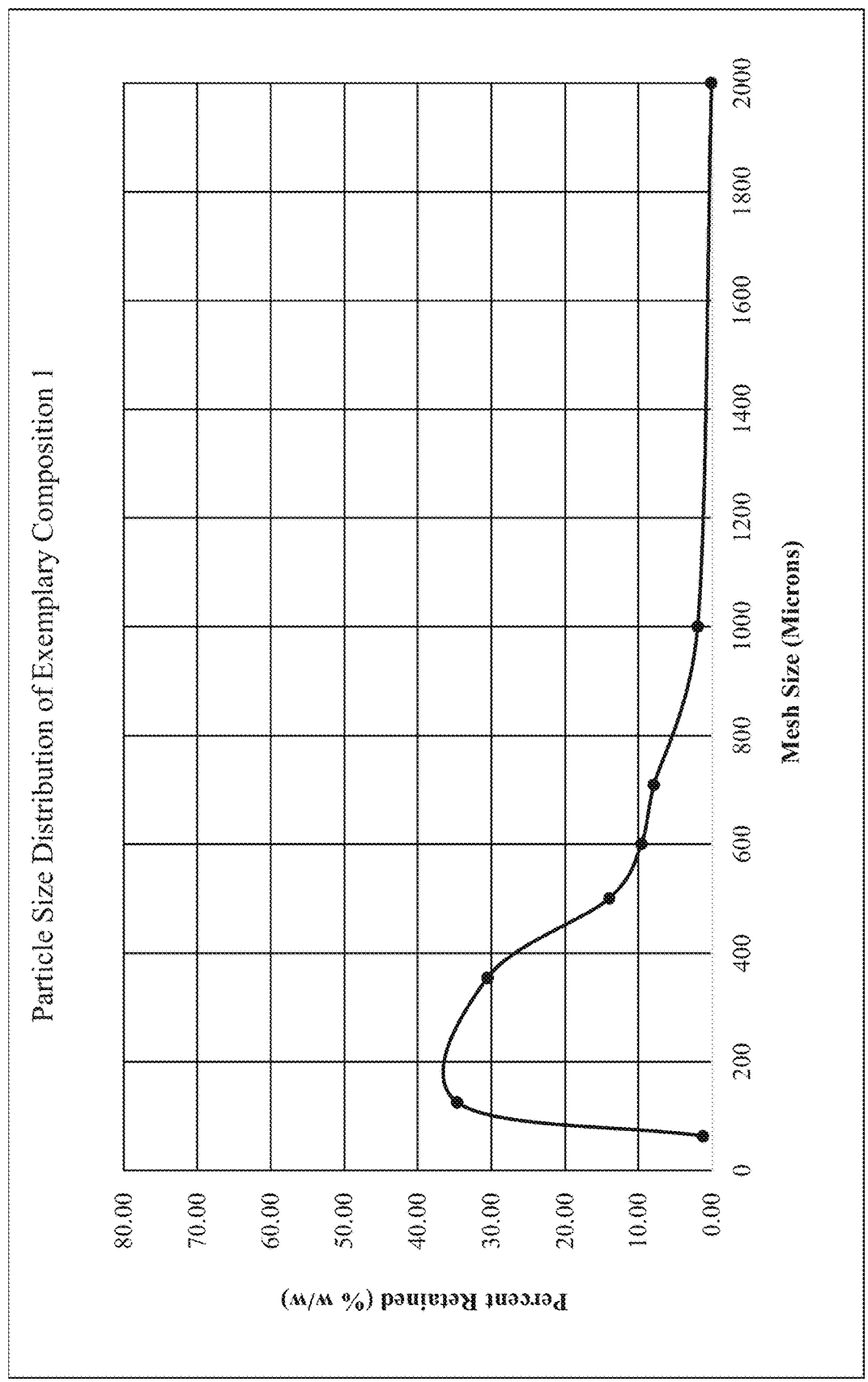
FIG. 1 depicts a particle size distribution (a plot of remaining powder vs. mesh size of a sieve) for an exemplary surface treatment powder.

The drawings are not intended to be limiting in any way, and it is contemplated that various embodiments of the invention may be carried out in a variety of other ways, including those not necessarily depicted in the drawings. The accompanying drawings that are incorporated in and form a part of the specification illustrates several aspects of the present invention, and together with the description serves to explain the principles of the invention.

DETAILED DESCRIPTION

The following description of certain examples of the invention should not be used to limit the scope of the present invention. Other examples, features, aspects, embodiments and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive. It is believed that the present invention will be better understood from the following description of certain examples taken in conjunction with the accompanying drawings:

All percentages, parts and ratios as used herein, are by weight of the total composition, unless otherwise specified. All such weights, as they pertain to listed ingredients, are based on the active level and, therefore, do not include solvents or by-products that may be included in commercially available materials, unless otherwise specified.

All references, including patent applications, patent publications and non-patent literature, which are referred to in the present specification are incorporated by reference herein, unless it is expressly indicated that they are not incorporated by reference herein.

Numerical ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9 and so forth.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made. The following description of certain examples of the invention should not be used to limit the scope of the present invention. Other examples, features, aspects, embodiments and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

As used herein, the terms "about" or "approximately" mean within an acceptable error range for the particular value as determined by one of ordinary skill in the art, which will depend in part on how the value is measured or determined, e.g., the limitations of the measurement system. For example, "about" may mean within standard certified limits as described in the U.S. Federal Code (40 CFR § 158.350), which are set forth in Table 1 below:

TABLE 1

| If the nominal concentration (N) for the ingredient and percentage by weight for the ingredient is: | The certified limits for that ingredient will be as follows: | |
|---|---|---|
| | Upper Limit | Lower Limit |
| $N \leq 1.0\%$ | $N + 10\% \, N$ | $N - 10\% \, N$ |
| $1.0\% \leq N \leq 20.0\%$ | $N + 5\% \, N$ | $N - 5\% \, N$ |
| $20.0\% \leq N \leq 100.0\%$ | $N + 3\% \, N$ | $N - 3\% \, N$ |

Where particular values are described in the application and claims, unless otherwise stated the term "about" meaning within the aforementioned standard certified limits should be assumed.

"Ambient moisture" as used herein means liquid vapor, e.g. water vapor, present in an environment. Ambient moisture may be described in terms of relative humidity in the environment.

"Ambient moisture-activatable" or "ambient moisture-activated" as used herein means a powder composition that "effectively treats" a surface after/while the powder has been/is being activated through absorption of water vapor from the powder's environment. Accordingly, a powder that is "ambient moisture-activatable" or "ambient moisture-activated" may also be capable of being activated through the direct, incidental and/or purposeful, addition of water to the powder. Thus, a powder that is "ambient moisture-activatable" or "ambient moisture-activated" pursuant to the present disclosure is one that is activatable without necessitating purposeful or incidental: addition of liquid (including water) to the powder, addition of the powder to liquid (including water), addition of liquid (including water) to a surface to which the powder is then applied and/or addition of the powder to a wet surface. In other words, a powder that is "ambient moisture-activatable" or "ambient moisture-activated" is also "liquid activatable" or "liquid activated."

"Effectively treats" as used herein means a reduction of microbial growth on a surface to which ambient moisture-activatable powder has been applied, as compared to the microbial growth on a comparable control surface to which no ambient moisture-activatable surface treatment powder has been applied. Treatment of a surface may include cleaning, disinfecting and/or sanitizing a surface. An "ambient moisture-activatable powder" is activated by ambient moisture in the environment.

"Comprising" as used herein, means that the various components, ingredients, or steps, can be conjointly employed in practicing the present invention. Accordingly, the term "comprising" encompasses the more restrictive terms "consisting essentially of" and "consisting of."

"Disinfectant" as used herein, refers to a substance or a mixture of substances (including solutions) that destroy or irreversibly inactivate bacteria, fungi and viruses, but not necessarily bacterial spores, in an inanimate environment or on a surface (e.g., in or on a substrate).

"Foot pan" as used herein means a receptacle that is used to treat footwear. Foot pans include pans, mats, floors and any other receptacles or surfaces that hold surface treatment powders, for example, cleaners, disinfectants and/or sanitizers.

"Sanitizer" as used herein, means a substance or a mixture of substances (including solutions) that reduce a bacterial population in an inanimate environment (e.g., a substrate) by significant numbers, (e.g., a 3 log 10 reduction) or more, but that does not destroy or eliminate all bacteria.

"Disinfectant/sanitizer" as used herein, refers to a composition that acts as a disinfectant and/or sanitizer. "Disinfecting/sanitizing" refers to the act of disinfecting and/or sanitizing. "Disinfection/sanitization" refers to the characteristic of being disinfecting and/or sanitizing.

"Substantially free" with respect to a component or class of components that has or have been specifically identified herein, means no effective amount of that specifically identified component or class of components, or from about 1 wt. % or less, from about 0.1 wt. % or less, or even from about 0.01 wt. % or less, or 0% (i.e., completely free) of the specifically identified component or class of components as specified herein. For example, some exemplary STPs are substantially free of anionic components (e.g., anionic surfactant), and/or substantially free of bicarbonate salts, and/or substantially free of EDTA; EDTA derivatives; HEDTA; HEDTA derivatives; and combinations thereof.

"Substantially free of quats" is used interchangeably herein with "quat free" and means containing less than 100 parts per billion of one or more quaternary ammonium compounds.

"STP" as used herein specifically refers to a powder disinfectant/sanitizer composition in accordance with the present disclosure. "STPs" specifically refers to powder disinfectant/sanitizer compositions in accordance with the present disclosure.

The inventors have found that STPs that are substantially free of quats may surprisingly provide for effective disinfection/sanitization and good shelf-stability, while addressing and overcoming a wide variety of issues associated with utilizing disinfectant/sanitizer powders and solutions that are known in the art. Some, but not all, of the surprising advantages of utilizing the present STPs in lieu of known quat containing disinfectant/sanitizer powders and liquids are described herein below.

By virtue of being quat free, the present STPs may not only be used in countries in which the use of quats is or will be prohibited, but they may also be used in a wide variety of settings, even those in which the presence of positively charges surface active species is highly undesirable. For example, in industries in which microorganisms (e.g., bacterial cultures, yeast, etc.) are utilized to make food and beverage products (e.g., breweries, wineries, cheese makers, yogurt makers, bakeries), destruction of such microorganisms may occur if they are accidentally contaminated with quat containing disinfectant/sanitizer compositions. A further example is in the water treatment industry in which microorganisms (e.g., anaerobic bacteria) are utilized to break down wastewater contaminants. Bacteria that are purposefully added to contaminated water may be destroyed and/or inactivated if accidentally contacted by quat containing disinfectant/sanitizer compositions.

It is believed that most known surface treatment powders require the intentional addition of liquid to activate the product. In contrast, the present exemplary STPs may be ambient moisture-activatable in addition to being liquid activatable. In some exemplary embodiments, the ambient moisture-activated STPs may reduce microbial growth on a surface to which ambient moisture-activatable STP has been applied as compared to the microbial growth on a comparable control surface to which no ambient moisture-activatable STP has been applied, without necessitating purposeful or incidental: addition of liquid (including water) to the powder; addition of the powder to liquid (including water); addition of liquid (including water) to a surface to which the powder is then applied; and/or addition or presence of the powder to a wet surface. Thus, these exemplary STPs may be activated by absorbing water vapor from the air. For these and other reasons that are described herein, ambient moisture-activated STPs have particular utility when compared to known powder compositions in industrial settings where dry conditions are preferred or required, and the presence of any water would have detrimental effects, such as on machinery and/or on the manufactured product.

Exemplary STPs may be ambient moisture activated at any relative humidity that is sufficient such that water vapor present in the environment may chemically interact with (e.g., dissolve) at least a portion of the powder. Some exemplary STPs may be activated at a relative humidity as low as about 5%. Some exemplary STPs may be activated at a relative humidity of: from about 20% to about 100%; from about 30% to about 100%; or from about 40% to about 100%.

When exemplary STPs are applied to a hard surface as a powder (rather than being diluted in water and then applied to a hard surface or applied to a large volume of water disposed on a hard surface), they may be activated by ambient moisture (e.g., they absorb water vapor from the environment) and/or through incidental addition of water thereto (e.g., rinse water from other cleaning or disinfecting procedures, drops of water on footwear, small amounts of water on the surface to which an STP is added, humidity, etc.) and/or through purposeful addition of water thereto (e.g., water poured on the powder). In any case, when exemplary STPs are contacted with water (including water vapor), localized portions of the STPs may be dissolved and thus activated. Without wishing to be bound by theory, it is believed that the presence of alkalinity and/or acidity sources in exemplary STPs maintains a pH that is the same as the initial localized pH of the STPs, during or after exposure to water (including water vapor). In some exemplary STPs, an initial pH of 7.0 to about 10.5 is maintained. In some exemplary STPs, an initial pH from about 7.5 to about 10.0 is maintained. In some exemplary STPs, an initial pH of from about 8.0 to about 9.8 is maintained. In some exemplary STPs, an initial pH of from about 9.0 to about 9.5 is maintained. It is believed that maintaining a desired pH in these ranges even after incidental exposure to water facilitates the relatively quick generation of peracetic acid (PAA), such that PAA may contribute to the immediate biocidal activity of exemplary STPs within seconds rather than minutes (for example, as described in a family of patents related to U.S. Provisional Pat. App. No. 62/587,112 (Glasbey, et al.) and Australian Pat. App. No. 2013904347 (to Glasbey) and in which pH (and color) is disclosed to change over time; and as described in Canadian Patent Number CA2569025C (Dagher, et al.) in which it is indicated that it can take at least 15 minutes for effective levels of peracetic acid to be generated).

By virtue of being ambient moisture activatable, STPs in accordance with the present disclosure may be used in environments in which the presence of any water-based liquid, including liquid disinfectant/sanitizer, is highly undesirable or even prohibited. For example, some food and beverage manufacturing facilities go to great lengths to maintain an environment that has a very low relative humidity, and may further expressly prohibit any use of water-containing products, in order to manufacture moisture-sensitive goods including, but not limited to, facilities that process nuts, make cereal, make flour, make powdered goods, etc. Accordingly, the present STPs, which are ambient moisture activatable, are particularly useful in these facilities, since they may be required by governmental regulations to disinfect and/or sanitize surfaces that are present therein.

Some known surface treatment compositions that include quats are restricted from containing anionic components due to their incompatibility with quats. When anionic components are present, they may complex with the positively charged quats, rendering the quats inactive against microorganisms. By virtue of being quat free, exemplary STPs may comprise anionic components without losing efficacy relative to quat containing disinfectants/sanitizers. As such, some exemplary STPs may comprise anionic components. It should be noted however, that exemplary STPs do not require the presence of anionic components and/or cellulosic components, specifically, anionic surfactants and/or cellulosic components, to maintain shelf stability, as has been described in WO Publication Number 2016/161253 A1 (Dotzauer, et al.). As such, some exemplary STPs may be substantially free of anionic components, more specifically, substantially free of anionic surfactants and/or substantially free of cellulosic components.

Like known surface treatment powders, the presence of exemplary STPs on a surface may serve as a visual signal that the surface is being treated. However, unlike some known surface treatment powders, such as those described in U.S. Pat. Pub. No. 2016/0066580 (Stevenson, et al.), which are white or off-white, the present ambient moisture-activated STPs may comprise colorant that may retain sufficient stability to impart color to them when in use. Thus, the presence of exemplary STPs on a surface may be readily distinguished from other powdered materials, a property that can be particularly advantageous in certain settings. For example, in food, beverage and dairy settings, ambient moisture-activated STPs comprising colorant, may be easily distinguished from powdered processing components, food ingredients and/or food products that are otherwise present there (e.g., salt, flour, sugar, baking powder, baking soda, powdered milk, etc.).

Some known surface treatment powders comprise beads and/or large spherical particles. When these surface treatments are used on surfaces where foot placement (e.g., in a foot pan) or where foot travel occurs (e.g., on a floor), they may result in a slip and fall hazard. The present ambient moisture-activated STPs may comprise particles that are non-spherical (e.g., particles that are crystals, flakes and/or rod-shaped, etc.). Thus, when applied to a surface where foot travel occurs, ambient moisture-activatable STPs may advantageously eliminate the slip hazard of competitive beaded products, while in some instances, adding traction.

Some known surface treatment powders may contain irritants that may become airborne when removed from their containers. It has been found that binders, like liquid polyethylene glycol and/or liquid EO-PO block copolymeric nonionic surfactants for example, may be used to bind solid particles of exemplary STPs without causing tackiness and while providing for a free-flowing product. Unlike some powder surface treatment compositions which are free of binders, particularly, free of polyethylene glycol or liquid EO-PO block copolymers nonionic surfactants, ambient moisture-activated STPs are less prone to becoming air-borne, as are any irritants contained therein, when the powders are removed from their containers.

As noted above, exemplary STPs and methods of using them may be characterized by having broad utility, including, but not limited to, utility in the food and beverage industries, in dairies, on farms and in animal and human health care environments. Within these and other environments, exemplary STPs may be used on a floor (including in cracks and crevices), dispensed into foot pans or on floor mats, used in entryways into buildings (e.g. in plants, warehouses, dairies), used in, around and/or on drain surfaces, used as intervention between rooms or between warehouse space and processing space, used in, on and/or around trash/waste receptacles, in and/or around construction barriers, in, on and/or around animal premises (e.g., poultry and swine premises) and anywhere else where a hard surface to be disinfected/sanitized is located. It should also be noted that STPs as described herein may act as a disinfectant and a sanitizer by respectively destroying or irreversibly inactivating certain bacteria, fungi and/or viruses present on a substrate, and reducing the population of certain other bacteria that are present on the same substrate.

Compositions

Exemplary hard surface treatment powders (STP) comprise: a peroxide source; an acyl group donor; and an alkalinity source. Some exemplary STPs further comprise binder. Additionally or alternatively, some exemplary STPs further comprise an acidity source. Additionally or alternatively, some exemplary STPs further comprise flow/anticaking agent. Additionally or alternatively, some exemplary STPs further comprise colorant. Additionally or alternatively, some exemplary STPs further comprise a chelating agent. Exemplary STPs may be: 1) flowable; 2) substantially free of one or more quaternary ammonium compounds; and 3) formulated to have an initial localized pH of from about 7.0 to about 10.5, from about 7.5 to about 10.0, from about 8.0 to about 9.8 or from about 9.0 to about 9.5, and to maintain the initial localized pH when dissolved in whole or in part by water. The aforementioned components and other components of use in exemplary STPs are described herein below.

Peroxide Source

Exemplary STPs may comprise a peroxide source. Exemplary peroxide sources of use may be selected from: percarbonate salt; perborate salt; perphosphate salt; persulfate salt; persilicate salt; peroxide salt; peracetate salt; and combinations thereof. Useful persalts may be associated with a cation that provides for an alkaline water-soluble persalt. Exemplary cations of use are alkali metals selected from: sodium; potassium; and combinations thereof. In some exemplary compositions, a persalt of use is sodium percarbonate having the formula:

$$2(Na_2CO_3) \cdot nH_2O_2$$

wherein n=1, 2 or 3, the "sodium percarbonate" having the hydrogen peroxide of crystallization.

Exemplary percarbonates of use may be coated, uncoated or combinations thereof. Some exemplary percarbonates of use are described in U.S. Pat. No. 7,241,433 to Jakob et al. and/or in U.S. Pat. No. 8,034,758 to Soentgerath. In some exemplary STPs, sodium percarbonate of use is commercially-available in the form of coated granulates to provide for enhanced stability.

One or more peroxide sources may be present in the STPs at from about 1% to about 30%, from about 1% to about 20%, from about 1% to about 10% or from about 3% to about 9.5%.

Acyl Group Donor

Exemplary STPs may comprise an acyl group donor, having the general structure of:

wherein R and R' are organyl substituents or hydrogen.

An acyl group donor may be characterized as a compound comprising good leaving groups that result in their corresponding peroxycarboxylic acids (i.e., peracids).

Without wishing to be bound by theory, it is believed that when an exemplary ambient moisture activatable STP is contacted with water and/or water vapor, release of peroxycarboxylic acid from perhydrolysis of an acyl group donor occurs, which may add to the oxidative potential of exemplary STPs, in turn adding to the disinfection/sanitization efficacy of the STP.

Exemplary acyl group donors of use may be selected from: compounds comprising an O-acyl moiety ("O-acyl donor"); compounds comprising an N-acyl moiety ("N-acyl donor"); compounds comprising both an O-acyl and N-acyl moiety ("O-, N-donor"); and combinations thereof.

Exemplary acyl group donors of use may be selected from: N,N,N,N'-tetraacetylmethylenediamine; N,N,N,N'-tetraacetylethylenediamine (TAED); N,N-diacetylaniline; N,N-diacetyl-p-toluidine; 1,3-diacetyl-5,5-dimethylhydantoin; 1,3-dipropionylhydantoin; 3-benzoylhydantoin-lacetic acid ethyl ester; N-methyl-N-mesylacetamide; N-methyl-N-mesylbenzamide; N-methyl-N-mesyl-p-nitrobenzamide; N-methyl-N-mesyl-p-methoxybenzamide; N,N',N'',N'''-tetraacetylglycoluril; N-acyl caprolactams; Sodium nonanoyloxybenzenesulfonate (NOBS); sodium 4-(2-decanoyloxyethoxycarbonyloxy)benzenesulfonate and/or salts thereof (DECOBS); lauryloxybenzylsulfonate (LOBS); iso-lauryloxybenzylsulfonate (i-LOBS); benzoyloxybenzylsulfonate (BOBS); decanoyloxybenzylsulfonate (C1 0-OBS); octanoyloxybenzylsulfonate (C8-OBS); 4-[N-(nonanoyl) aminohezanoyloxy]-benzyl sulfonate-sodium salt (NACA-OBS); 10-undecenoyloxybenzylsulfonate (UDOBS); ecanoyloxybenzoec acid (DOBA); glyceryl diacetate (Diacetin); glycerine triacetate (triacetin); N-Acetyl-9-O-acetylneuraminic acid; and combinations thereof.

One or more acyl group donors may be present in the STPs at from about 0.5% to about 15%, from about 1% to about 10%, from about 1% to about 6% or from about 2% to about 5%.

Alkalinity Source

Exemplary STPs may comprise an alkalinity source. Without wishing to be bound by theory, it is believed that when an exemplary STP is contacted with water or moisture, alkaline peroxide/hydroperoxyl radicals are released. It is further believed that release of alkaline peroxide/hydroperoxyl radicals into an STP may cause perhydrolysis of acyl groups from acyl group donors, which causes a release of peroxycarboxylic acid, which may add to the oxidative potential of exemplary STPs, in turn adding to the disinfection/sanitization efficacy of the STP. It is believed that useful alkalinity sources may further act as buffering agents in exemplary STPs, helping to maintain the pH of the STPs within a useful range as described herein below. Some exemplary alkalinity sources may further function in exemplary STPs as stability enhancers, solid diluents and/or flow enhancers.

Exemplary alkalinity sources of use include alkali metal carbonates. Useful alkali metal carbonates may be selected from: sodium carbonate; sodium bicarbonate; potassium carbonate; lithium carbonate, ammonium carbonate; and combinations thereof.

Some exemplary STPs are substantially free from bicarbonate salt(s), since the presence of sodium bicarbonate in an STP may otherwise release water as a byproduct of acid neutralization. Without wishing to be bound by theory, it is believed that such a release of water may be detrimental to shelf stability of an STP, since any peracetic acid that forms in an STP during storage may react with bicarbonate salt(s) present therein and release yet more water, which may in turn result in other active ingredients dissolving, spurring further chemical reactions in the STP. Thus, exemplary STPs that are substantially free of bicarbonate salt(s) may be more shelf-stable as compared to similar STPs containing sodium bicarbonate. For those exemplary STPs that do contain bicarbonate salts, such as sodium bicarbonate, an acid such as citric acid, may be added to at least partially mitigate the effect of the bicarbonate salt in the formulation as described herein below.

One of ordinary skill in the art may adjust the kind and amount of alkalinity source(s) to include in an STP in accordance with the present disclosure, based in part upon the kind and amount of acidity source(s) that are utilized in the STP. Some exemplary ambient moisture-activated STPs may comprise one or more alkalinity sources at from about 1 wt. % to about 85 wt. %, from about 10 wt. % to about 70 wt. %, from about 20 wt. % to about 65 wt. % or from about 30% to about 60%. It is to be noted that if a particularly strong acid or a particularly weak acid is utilized as an acidity source in exemplary STPs as described herein, that the useful weight percentages of alkalinity sources may vary from those that are described above, as would be known to one of ordinary skill in the art.

Binder

Known surface treatment powders may contain irritants that may become airborne when removed from their containers (e.g., treatment powders containing components having a small particle size, such as bicarbonate, soda ash and solid quat). It has been found that the presence of one or more dust-reducing additives may be used to bind solid particles of exemplary STPs without dissolving the powders or causing tackiness, and while still providing for a free-flowing product. Binders, like polyethylene glycol or EO-PO block copolymers for example, may have a dust-reducing function in exemplary STPs, without negatively impacting sanitizer level efficacy. Thus, unlike some known powder surface treatment compositions that are substantially free of binders, particularly, substantially free of polyethylene glycol or EO-PO block copolymers, exemplary STPs that comprise binders as described herein are less prone to becoming airborne when removed from their container.

One or more binders may be present in exemplary STPs. Exemplary binders of use may be selected from: nonionic surfactants that are substantially free of water (e.g., EO-PO block copolymers, fatty alcohol ethoxylates, alkylpolyglycosides and combinations thereof), mineral oil and/or combinations of higher alkanes; glycols such as polyethylene glycol, propylene glycol and/or ethylene glycol; and combinations thereof. Some exemplary STPs comprise polyethylene glycol having an average molecular weight of from about 200 to about 1,000 g/mol and/or EO-PO block copolymers having an HLB from about 2 to about 9. Exemplary EO-PO block copolymers of use include, but are not limited to, poloxamer 181, poloxamer 182, poloxamer 331 and combinations thereof. Some exemplary non-ionic surfactants of use that include those that are not characterizable by an HLB value; theses surfactants include alcohols that are insoluble when present in DI water at above 1% (w/vol).

Some exemplary STPs comprise liquid polyethylene glycol and/or EO-PO block copolymers at from about 0.001% to about 7%, from about 0.01% to about 5.0%, from about 0.05% to about 3%, or from about 0.05% to about 2%.

Acidity Source

Together with an alkalinity source, an acidity source may be present in exemplary STPs to provide for STPs having and maintaining a useful pH as described hereinbelow. Any useful acidity source may be utilized. Exemplary acidity sources may be selected from: formic acid; acetic acid; lactic acid; citric acid; succinic acid: glycolic acid; sulfamic acid; phosphoric acid; propionic acid; hydrochloric acid; the respective sodium salts of any of the foregoing acidity sources; the respective potassium salts of any of the foregoing acidity sources; and combinations thereof. Some exemplary STPs may comprise any one or more of the foregoing exemplary acidity sources and further acidity sources selected from sulfuric acid, bisulfate anion and combinations thereof. Yet further exemplary STPs may comprise an acidity source selected from: succinic acid; citric acid; and combinations thereof.

One of ordinary skill in the art may adjust the kind and amount of acidity source(s) to include in an STP in accordance with the present disclosure, based in part upon the kind and amount of alkalinity source(s) that are utilized in the STP. Some exemplary compositions may comprise one or more acidity sources in an amount of from about 0.5% to about 60%, from about 1% to about 55%, from about 2% to about 50% or from about 5% to about 40%, or from about 8% to about 30%. It is to be noted that if a particularly strong base or a particularly weak base is utilized as an alkalinity source in exemplary STPs as described herein, that the useful weight percentages of acidity sources may vary from those that are described above, as would be known to one of ordinary skill in the art.

Flow/Anticaking Agent

Exemplary STPs may comprise flow/anticaking agent to impart lubricity between particles contained therein, so that they slide past each other, rather than clump together, and act as a moisture scavenger to prevent bridging of components prone to cake or solidify. Any useful flow/anticaking agent may be included in the STPs. Exemplary flow/anticaking agents of use may be selected from: precipitated, milled, amorphous or fumed silica (e.g., Sipernat® D13, Sipernat® 340, Sipernat® 50S, Zeofree® 5161, Zeofree® 600, Aerosil® R 972 from Evonik Industries (Essen, Germany), Syloid® 244, Syloid® AL-1, Perkasil® SM500F, Perkasil® SM660 from W. R. Grace & Co. (Columbia, Md.)); magnesium stearate; calcium stearate; modified starches; cellulose and cellulose derivatives (hydroxypropyl methylcellulose, carboxymethyl cellulose etc.); clays; zeolite; and combinations thereof.

One or more flow/anticaking agents may be present in the STPs at from about 0.01% to about 2%, from about 0.03% to about 1.5%, from about 0.05% to about 1.0%, or from about 0.05% to about 0.8%.

Colorant

Exemplary STPs may comprise colorant. In accordance with the present disclosure, exemplary STPs may be formulated so that color is maintained in the STPs during storage and while present on a surface that is being treated, regardless of all or a portion of the STPs being exposed to water and/or water vapor. Useful colorants may include those that are insoluble in water and/or less prone to reaction/degradation by oxidative biocide that is produced therein.

Exemplary STPs may be formulated so that color imparted to the exemplary STPs by colorant remains visible to the naked eye, even after one or more active ingredients contained therein are solubilized, for example, when in use and after localized exposure of the STP to water and/or water vapor (or in case an entire exemplary STP is solubilized by water). It is believed that until now, no one has formulated a quat free powdered disinfectant/sanitizer that is applied in a dry state to a surface to be treated and that comprises a colorant that is shelf-stable and maintains its color after the powder has been applied to a hard surface, even after the powder is exposed in whole or in part to water and/or water vapor. Without wishing to be bound by theory, it is believed that exemplary colorants of use are stable in exemplary STPs, due to their insolubility in water. Since exemplary colorants of use may not readily dissolve in water, soluble oxidizers may not readily react with the colorants, which would otherwise cause them to lose or change their color.

The presence of colorant in exemplary STPs may act as a visual signal that the surface to which the colorant is applied and/or is in contact with is being treated with the STPs. Accordingly, exemplary STPs comprising colorant may be contrasted from some known powdered disinfectant and/or sanitizer compositions that are also applied in a dry state and to be left on a surface to treat a surface over time, but that are white or off-white, including, but not limited to, those described in U.S. Pat. Pub. No. 2016/0066580 (Stevenson, et al.). Further, exemplary STPs may be contrasted from other known disinfectant and/or sanitizer compositions that are diluted and require time to become effective prior to being applied to a surface to be treated including, but not limited to, those described in a family of patents related to U.S. Provisional Pat. App. No. 62/587,112 (Glasbey, et al.) and Australian Pat. App. No. 2013904347 (B2) to Glasbey. According to the Glasbey, et al. disclosures, sanitizer compositions described therein are intentionally formulated to be diluted in water prior to use to generate a colored solution, which after a period of time, changes color when an effective amount of peracetic acid has been generated in the solution; the color change of the solution being specifically intended to signal to the user that the colored solution is now ready for application to a surface to be treated.

Since exemplary STPs may maintain their color during use, they may be readily distinguished from other powdered materials that may be found in certain settings. For example, in food manufacturing and processing settings, beverage manufacturing and processing settings and in dairy settings, powdered processing components, ingredients, and/or food products, and/or beverages that are white or off-white may be commonly found (e.g., salt, flour, sugar, baking powder, baking soda, powdered milk, etc.). When in use, known white or off-white disinfectant/sanitizer powders may be easily confused with those ingredients, and/or food products, and/or beverages. Such confusion may lead to contamination of foodstuffs and beverages and/or kill organisms that are intentionally present in these environments (e.g., starter cultures, which are critical elements in the production of leavened baked goods, alcoholic beverages (e.g., beer, wine, spirits etc.) and cultured dairy products (e.g., sour cream, cottage cheese etc.)).

Exemplary STPs may comprise one or more colorants selected from: dye, pigment and combinations thereof. One of ordinary skill in the art may choose an appropriate colorant to use based upon the intended use of the powder. Some exemplary STPs may contain colorant that imparts a hue thereto, wherein the hue may be selected from: blue; purple; green; red; or any other hue that differentiates an exemplary STP from powdered processing components, ingredients, and/or food products, and/or beverages that are white or off-white may be commonly found in certain settings (e.g., salt, flour, sugar, baking powder, baking soda, powdered milk, etc.). In the event that an exemplary STP is to be used in an environment that contains colored powders, the exemplary STP may not comprise a colorant and/or may comprise a white colorant, fluorescent colorant, etc., so that the STP may be clearly distinguished from the colored powders that are in use.

Exemplary pigments of use may be selected from: organic pigments, inorganic pigments and combinations thereof. Exemplary organic pigments may be selected from: azo pigments (e.g., condensed and/or chelate azo pigments); thiazoles; polycyclic pigments (e.g., phthalocyanines; anthraquinones (e.g., alizarin); quinacridones; thioindigoids; isoindolinones; and/or quinophthalones) and combinations thereof. These and other useful organic pigments may be found in U.S. Pat. No. 8,535,392 (Hong, et al.). Exemplary inorganic pigments may be selected from: black pigments (e.g., carbon black); iron-oxide earth pigments (e.g., hematite; hydroxide goethite; iron oxides; manganese oxides; and combinations thereof); chromium pigments (e.g., chromium oxide); cadmium pigments; metallic pigments; iron blue; and combinations thereof. Some exemplary inorganic pigments that may be of use are described in U.S. Pat. No. 10,836,732 to Hallenbach.

Some exemplary STPs comprise pigments selected from: Pigment Blue 29; Direct Yellow 28; LX-8939 Permanent Aquamarine; Pylam Dark Violet LX-11400 from Orco (Lincoln, R. I.); Orcoperm AG Ultramarine Blue from Orco (Lincoln, R. I.); and combinations thereof. Some exemplary STPs comprise Orcoperm AG Ultramarine Blue from Orco (Lincoln, R. I.).

Some exemplary STPs comprise dye. Useful dyes may be selected from: azo dyes; thiazine dyes; anthraquinone dyes; polyalkyleneoxy based polymeric dyes; and combinations thereof. Exemplary species of dyes of use may be selected from: C.I. Basic Orange 2; FD&C Red #40; C.I. Disperse Blue 156; C.I. Disperse Blue 148; Acid Red 37; Acid Orange 52; Disperse Blue 106; Basic Blue 24; Basic Green 5; Liquitint® Blue HP from Milliken Chemical (Spartanburg, S. C.); Liquitint Blue MC from Milliken Chemical (Spartanburg, S. C.); Liquitint Violet 129 from Milliken Chemical (Spartanburg, S. C.); D&C Red #28; Pylaklor Dark Blue LX-9442 from Pylam Dyes™ (Tempe, Ariz.); Pylaklor LX-8939 Permanent Aqua from Pylam Dyes™ (Tempe, Ariz.); and combinations thereof.

Some exemplary dyes and pigments of use are disclosed in Chinese Patent Publication Number 104364364A (The Procter & Gamble Co.).

Exemplary STPs comprise one or more colorants at from about 0.0001 wt. % to about 1 wt. %, from about 0.001 wt. % to about 0.7 wt. %, from about 0.005 wt. % to about 0.6 wt. %, or from about 0.05 wt. % to about 0.5 wt. %.

Chelating Agent

Exemplary STPs may comprise chelating agent. Without wishing to be bound by theory, it is believed that by binding metal ions that are present in exemplary STPs, a chelating agent (i.e. chelant) may stabilize the exemplary STPs. More particularly, it is believed that the presence of a chelating agent may prevent decomposition of peroxides and peroxy compounds by binding metal ions that would otherwise catalyze their decomposition in exemplary STPs.

Exemplary STPs may comprise chelating agent selected from: ethylenediaminetetraacetic acid ("EDTA"); EDTA derivatives; 8-hydroxyquinoline; N,N-dicarboxymethyl glutamic acid ("GLDA"); GLDA derivatives; N-(2-Hydroxyethyl)ethylenediaminetriacetic acid ("HEDTA"); ethanoldiglycinic acid ("EDG"); methylglycinediacetic acid (MGDA); glucoheptonic acid; pyrophosphoric acid; hypophosphorous acid; tripolyphosphoric acid; citric acid; phosphonic acid; polyamino phosphonic acid; the respective sodium salts of any of the foregoing chelating agents; the respective potassium salts of any of the foregoing chelating agents; and combinations thereof. Notably, any one or more of the exemplary chelating agents may also serve as an acidity source in the present STPs.

Further exemplary STPs may comprise chelating agent selected from: phosphonic acids; and polyamino phosphonic acids (e.g., 1-hydroxyethilidene 1,1-diphosphonic acid; aminotris (methylenephosphonic acid); and combinations thereof)); diethylenetriamine penta(methylene phosphonic acid); bis(hexamethylene triamine penta(methylenephosphonic acid)); ethylidenediamine tris(methylene phosphonic acid); hexamethylenediamine tetra(methylene phosphonic acid); the respective sodium salts of any of the foregoing chelating agents; the respective potassium salts of any of the foregoing chelating agents; and combinations thereof.

Some exemplary STPs may comprise one or more chelating agent(s) in any suitable amount. For example, exemplary STPs may comprise chelating agent at from about 0.1 wt. % to about 10 wt. %, 0.1 wt. % to about 15 wt. %, from about 0.5 wt. % to about 13 wt. %, from about 1 wt. % to about 10 wt. %, from about 1% to about 5%, or from about 1% to about 7% of the ambient moisture-activated STPs. Other exemplary STPs may be substantially free of chelating agent(s).

While some exemplary STPs comprise EDTA and its derivatives, and/or HEDTA and its derivatives, others are may be substantially free thereof. Without wishing to be bound by theory, it is believed that the presence of these chelating agents in some exemplary STPs may hinder peracetic acid generation, thus in some instances, reducing the generation of PAA as much as about 70%.

Exemplary compositions may be formulated so that when in use and contacted in part or in whole with water and/or water vapor, they respectively maintain their initial or overall pH as well as the pH at the location where the water and/or water vapor exposure occurs ("localized pH"). The overall pH and/or localized pH of exemplary STPs, may range from about 7.0 to about 10.5, from about 7.5 to about 10.0, from about 8.0 to about 9.8, or from about 9.0 to about 9.5. Without wishing to be bound by theory, it is believed that the overall pH of exemplary STPs, including any localized pH, are maintained by the presence of an alkalinity source and in some exemplary compositions, the presence of both an alkalinity source and an acidity source therein. It is further believed that maintenance of the overall pH of exemplary STPs, including any localized pH, when in use, may facilitate perhydrolysis of acyl groups from acyl group donors, which may in turn cause a release of peroxycarboxylic acid, which may add to the oxidative potential of exemplary STPs, in turn adding to the disinfection/sanitization efficacy of the STPs. Thus, exemplary compositions maintain their initial pH after they have been dissolved in whole or in part with water vapor and/or a liquid, e.g., water.

Methods of Use

As noted above, exemplary STPs and methods of use described herein may be characterized by having broad utility and can be used in any setting to treat a hard surface (as opposed to soft surfaces, such as laundry), for example, hard surfaces in wet and dry environments, even in very dry environments (i.e., environments with very low ambient humidity).

Exemplary methods of treating a hard surface comprise applying to the hard surface an exemplary STP. Treatment of a hard surface may further comprise: cleaning the hard surface; sanitizing the hard surface; disinfecting the hard surface; and combinations thereof. Since exemplary ambient moisture activatable STPs do not require addition of liquid to be activated, exemplary methods may comprise applying the STPs to dry surfaces, particularly dry surfaces in environments where the ambient moisture is kept as low as possible and/or the use of aqueous liquids is strictly prohibited, such as in facilities in which dry foodstuffs (e.g., flour, sugar, cereal, nuts, baking powder, baking soda, etc.) are used or made.

Since exemplary STPs are effective as disinfectant/sanitizers through activation via ambient moisture, exemplary methods of using the STPs to disinfect/sanitize a surface in environments having even ultralow ambient humidity, may comprise disinfection/sanitization of a surface without any one or more of the following that some known disinfectant/sanitizer compositions require: purposefully adding liquid to exemplary STPs after they have been applied to a hard surface to be treated; adding liquid to a hard surface to be treated prior to applying exemplary STPs to the hard surface; dissolving exemplary STPs in water, prior to being applied to a surface to be treated; and combinations thereof.

Some exemplary methods may further comprise increasing foot traction on the hard surface through application of an exemplary STP thereto; in such exemplary methods, an exemplary STP may be applied to a surface in an entryway, on a floor, in a foot pan (as described below), etc. Some exemplary methods comprise applying an exemplary STP to a surface around a drain and/or a drain cover (e.g., grating).

Some exemplary methods comprise treatment of footwear with exemplary STPs and comprise dispensing an exemplary STP into a foot pan or any other surface where people walk (e.g., a floor, in a doorway, at a threshold, etc.). Exemplary methods of treating footwear comprise dispensing an exemplary STP into a foot pan or surface where people walk at any desirable level, for example, at a level of about ½-inch, or more. It is believed that some exemplary methods may comprise changing the foot powder about every 4 to about every 12 weeks, from about every 4 to about every 10 weeks, from about every 4 to about every 8 weeks or from every 4 to 6 weeks. Some exemplary methods may comprise changing the foot powder at from about every 6 to about every 10 weeks. Such exemplary methods maintain benefits selected from the group of: cleaning, odor control, disinfection, sanitization and combinations thereof.

In some exemplary methods of using STPs, the STPs may effectively treat a surface to which the STP has been applied or that has otherwise been exposed to the STP for a period of time. Thus, some exemplary methods comprise leaving an STP on a surface for a period of time and supplementing or replacing the STP with additional STP from time to time. Such supplementation may be advantageous when some or all of the STP that is present in/on a surface is dissolved as described herein and/or otherwise contaminated (e.g., with dirt and/or debris) and/or depleted (e.g., kicked out of a foot pan, unintentionally scattered, etc.).

Advantageously, some exemplary methods of disinfecting/sanitizing a surface do not require diluting powder prior to application to a hard surface to be treated, waiting for an effective amount of PAA to be generated, and/or successively rinsing the applied solution afterwards. But rather, exemplary STPs are applied to a surface and PAA is generated as exposure to moisture and/or liquid occurs. As a result, PAA may not be generated and depleted all at once and is instead being generated over time.

Method of Manufacture

Exemplary STPs may be made using routine techniques. For example, exemplary STPs may be made as follows. In a suitable blender (e.g., ploughshare, paddle or ribbon blender) and using a sparge of clean, dry air if humidity is above 40%, formula amounts of both alkaline salt and acid pH adjuster are charged into the blender and blended until uniform. If it is to be included in the composition, a colorant is added to the blender in one of two ways. The first way is to retain a portion of either alkaline salt or acidity source and preblend it with the colorant and then add the resulting blend to the blender. The second way is to directly add the colorant to the blender. Regardless, after the colorant is added to the rest of the charge, the components are mixed until uniform. If it is to be included in the composition, a binding agent is sprayed into the uniform mixture and mixed until thoroughly distributed. If it is to be included in the composition, flow/anticaking agent is weighed in and blended until thoroughly distributed. An acyl group donor and peroxide source are weighed in and blended until the mixture is uniform, resulting in an exemplary STP.

EXAMPLES AND DATA

Referencing Table 2, formulations of exemplary STPs (Examples 1 through 9) are shown. Referencing Tables 3A and 3B, comparative powders (Comparative Examples 1 through 6) are shown.

TABLE 2[1]

| | Exemplary Compositions Example # | | | | | | | | |
|---|---|---|---|---|---|---|---|---|---|
| | 1 | 2 | 3 | 4 | 5 | 6 | 7 | 8 | 9 |
| Alkalinity Source | | | | | | | | | |
| Sodium Bicarbonate | — | — | — | 44.5 | — | — | — | — | — |
| Sodium Carbonate | 58.4 | 59 | 58.6 | 35 | 58.5 | 54.5 | 59 | 55.5 | 58.4 |
| Acidity Source | | | | | | | | | |
| Citric Acid, Anhydrous | 29.1 | 29.4 | 29.2 | 8 | — | 26.5 | 29 | 27.7 | 29.2 |
| Succinic Acid | — | — | — | — | 28.2 | — | — | — | — |
| N-acyl/O-acyl Donor | | | | | | | | | |
| Tetraacetylethylenediamine (TAED) | 3.55 | 3.55 | 3.55 | 3.55 | 3.55 | — | 3.5 | 3.5 | 3.55 |
| Sodium nonanoyloxybenzenesulfonate (NOBS) | — | — | — | — | — | 6 | — | — | — |
| Peroxide Source | | | | | | | | | |
| Sodium Percarbonate (Coated) | 6.4 | 6.4 | 6.4 | 6.4 | 6.4 | — | 6.4 | 6.4 | 6.4 |
| Sodium Perborate Tetrahydrate | — | — | — | — | — | 9.3 | — | — | — |
| Chelant | | | | | | | | | |
| Trisodium methylglycinediacetic acid (Na$_3$-MGDA) | — | — | — | — | — | — | 0.1 | — | — |
| Tetrasodium 1-hydroxyethilidene 1,1-diphosphonic acid (Na$_4$-HEDP) | — | — | — | — | 1 | — | — | — | — |
| Binder | | | | | | | | | |
| Polyethylene Glycol 400 | 1 | 0.2 | — | 1 | 0.2 | — | — | — | 1 |
| Mineral Oil | — | — | — | — | — | — | — | 3.3 | — |
| Poloxamer 181 | — | — | 1 | — | — | 0.5 | — | — | — |
| Poloxamer 182 | — | — | — | — | — | — | 0.2 | — | — |
| Flow/Anticaking Agent | | | | | | | | | |
| Sipernat 340 | — | — | — | — | — | 0.5 | — | 2 | — |
| Sipernat D13 | — | — | 0.2 | — | — | — | — | — | — |
| Calcium Stearate | 0.1 | 0.1 | 0.04 | 0.1 | 0.1 | — | — | — | — |
| Colorant | | | | | | | | | |
| Orcoperm AG Ultramarine Blue | 0.05 | 0.05 | 0.05 | 0.05 | — | — | — | — | — |
| Pylaklor LX-8939 Permanent Aqua | — | — | — | — | 0.1 | — | — | — | — |
| Pylam Dark Violet LX-11400 | — | — | — | — | — | 0.01 | 0.5 | — | — |
| Liquitint Violet 129 | — | — | — | — | — | — | — | 0.01 | — |
| pH | 9.0-10.0 | 9.0-10.0 | 9.0-10.0 | 9.0-10.0 | 9.0-10.0 | 9.0-10.0 | 9.0-10.0 | 9.0-10.0 | 9.0-10.0 |

[1]Weight percentages of components in formulations set forth in Table 2 are based upon active amounts, and as such, they may not total 100% for a given example powder formulation.

TABLE 3A[2]

| | Comparative Examples | | | | |
|---|---|---|---|---|---|
| Example # | 1 | 2 | 3 | 4 | 5 |
| Alkalinity Source | | | | | |
| Sodium Bicarbonate | 72.00 | 51.50 | — | — | — |
| Sodium Carbonate | 5.00 | 32.50 | 43.50 | 40.00 | — |
| Sodium Hydroxide | — | — | — | 4.00 | — |
| Acidity Source | | | | | |
| Sodium Bisulfate | — | — | 44.00 | — | — |
| Quaternary Ammonium Compound | | | | | |
| n-Alkyl (C14 95%, C12 3%, C16 2%) | 2.00 | — | — | — | — |
| Dimethyl Benzyl Ammonium Chloride Dihydrate | | | | | |
| N-acyl/O-acyl Donor | | | | | |
| Tetracetylethylenediamine (TAED) | — | 3.63 | 3.55 | — | — |
| Glyceryl Triacetate | — | — | — | 4.00 | — |
| Peroxide Source | | | | | |
| Sodium Percarbonate (Uncoated) | 13.00 | 6.40 | — | 44.20 | 95.00 |
| Sodium Percarbonate (Coated) | — | — | 6.40 | — | — |

TABLE 3A[2]-continued

| | Comparative Examples | | | | |
|---|---|---|---|---|---|
| Example # | 1 | 2 | 3 | 4 | 5 |
| Chelant | | | | | |
| Tetrasodium Ethylenediaminetetraacetic acid (Na$_4$-EDTA) | 5.00 | — | — | — | — |
| Trisodium methylglycinediacetic acid (Na$_3$-MGDA) | — | 4.00 | — | — | — |
| Binder | | | | | |
| Polyethylene Glycol 400 | 1.00 | — | 1.00 | — | — |
| Flow/Anticaking Agent | | | | | |
| Calcium Stearate | — | — | 0.10 | — | — |
| Colorant | | | | | |
| Orcoperm AG Ultramarine Blue | — | — | 0.100 | — | — |
| Liquitint Blue HP | 0.005 | — | — | — | — |
| Liquitint Violet 129 | — | 0.005 | — | — | — |
| pH | 9.2 | 9.0-10.0 | 9.0-10.0 | 11.2 | 10.4-10.6 |

[2]Weight percentages of components in formulations set forth in Table 3A are based upon active amounts, and as such, they may not total 100% for a given example powder formulation.

TABLE 3B[3]

| Comparative Example # | Comparative Example 6 |
|---|---|
| Calcium Hypochlorite | 0-5.25 |
| Sodium Chloride | 10-20 |
| Calcium Chlorate | 0-5 |
| Calcium Chloride | 0-5 |
| Calcium Hydroxide | 0-4 |
| Calcium Carbonate | 0-5 |
| Water | 5.5-10 |
| Sodium Sulfate | 50-75 |
| pH | 10.4-10.8 |

[3]Weight percentages of components in formulations set forth in Table 3B are based upon active amounts, and as such, they may not total 100% for a given example powder formulation.

Exemplary STPs comprise non-spherical particles (e.g., particles that are crystals, flakes and/or rod-shaped, etc.). To demonstrate the average particle size distribution of exemplary STPs, they may be subject to a sieve analysis. A sieve analysis of an exemplary STP according to Example 1 is set forth in Table 4:

TABLE 4

| | | Sample weight (g) | | | |
|---|---|---|---|---|---|
| Sieve | unit | Empty (g) | Filled (g) | Particle Weight | 50.3 g Total % |
| 2000 | mic | 372.78 | 372.82 | 0.04 | 0.0797 |
| 1000 | mic | 332.55 | 333.52 | 0.97 | 1.9319 |
| 710 | mic | 323.47 | 327.42 | 3.95 | 7.8670 |
| 600 | μm | 297.15 | 301.95 | 4.8 | 9.5598 |
| 500 | μm | 295.51 | 302.53 | 7.02 | 13.9813 |
| 355 | μm | 262.21 | 277.53 | 15.32 | 30.5119 |
| 125 | μm | 267.78 | 285.17 | 17.39 | 34.6345 |
| 63 | μm | 259.96 | 260.56 | 0.6 | 1.1950 |
| base | — | 351.71 | 351.83 | 0.12 | 0.2390 |
| top | — | 711.94 | 711.94 | 0 | 0.0000 |
| | | | | 50.21 | 100 |

The results of the sieve analysis are plotted in FIG. 1. As can be seen in FIG. 1, the average particle size of an exemplary STP according to Example 1 contains particles ranging in size of from about 63 microns to about 1,000 microns, with over about 65% of the particles having a size of from about 125 microns to about 355 microns. In contrast, Ultra Powder™ from Sterilex (Hunt Valley, Md.) contains particles ranging in size of from about 50 microns to about 1,000 microns, but has a much higher percentage of particles that are smaller than about 125 microns as shown in U.S. Pat. No. 10,053,653 (Fu, et al.). Without wishing to be bound by theory, it is believed that the difference in particle size distribution between the exemplary STP and Ultra Powder™ is due to the distribution of sodium bicarbonate and quaternary ammonium salt in Ultra Powder™.

When exemplary STPs, such as the one subjected to the sieve analysis, and Ultra Powder™ are similarly removed from a container and/or applied to a treatment surface by broadcasting, pouring, using a push-behind spreader, comparatively less dust appears to be generated by the exemplary STPs. Moreover it is believed that the smaller and non-spherical particles in exemplary STPs provide more traction when treaded upon than known powders that contain large spherical particles and can pose a slip and fall hazard.

Ambient moisture uptake of exemplary STPs and comparative powders may be undertaken by gravimetric analysis. The mass of a powder sample and its respective weigh boat are weighed to the nearest 0.01 g. The powder sample is placed in an environmental chamber set to 25° C. and 60% relative humidity. The sample mass is recorded regularly for 14 days with at least 4 hours between measurements.

Figure 2:
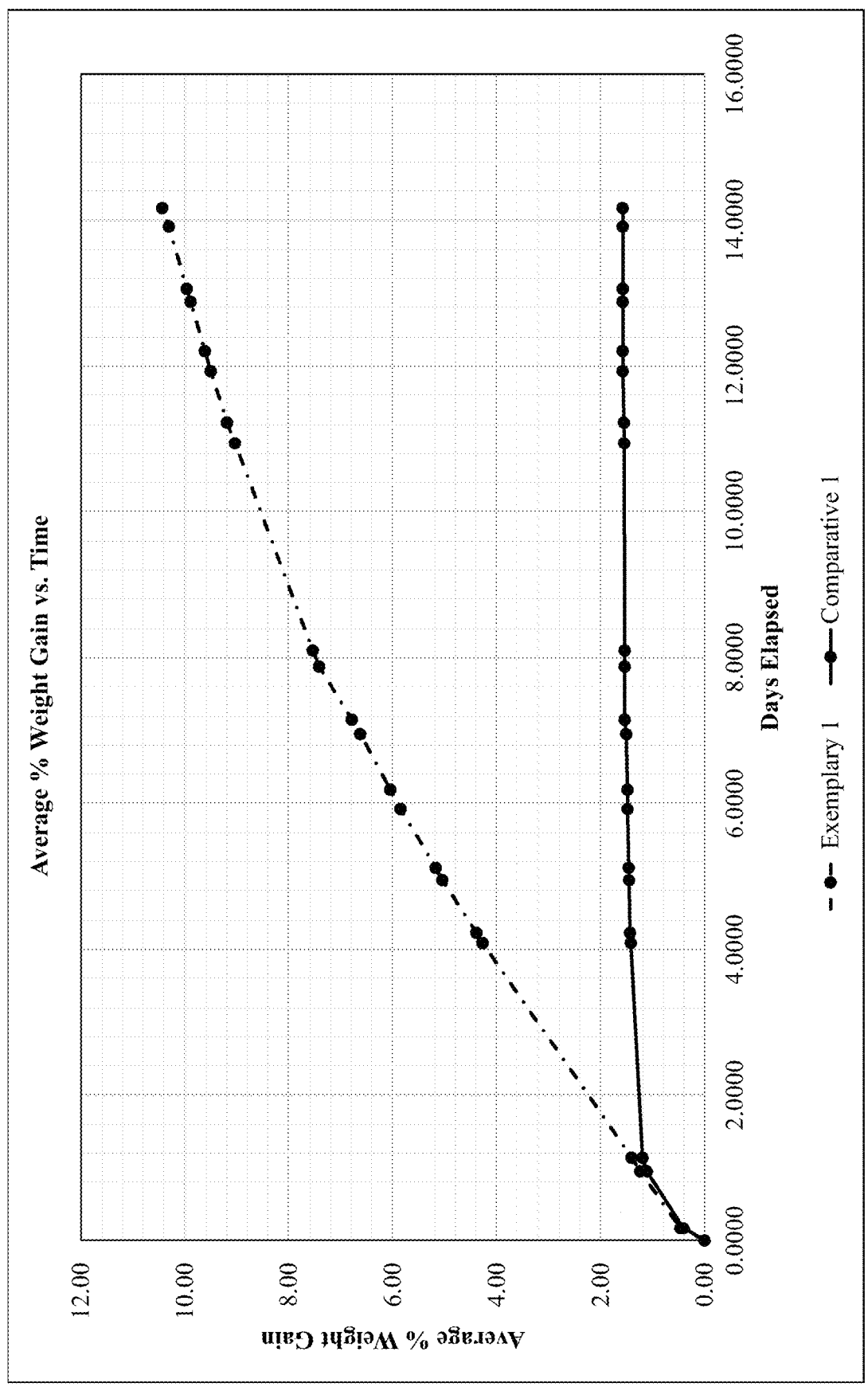
FIG. 2 depicts a plot of average weight gain vs. time of an exemplary surface treatment powder and a comparative powder.

Moisture uptake of an exemplary STP in accordance with Example 1 and Comparative Example 1 is measured as described above and the data recorded. Results of the ambient moisture uptake for each sample is shown in FIG. 2. As can be seen in FIG. 2, a quat free STP in accordance with the present disclosure may take up more moisture than a comparable quat containing STP. Without wishing to be bound by theory, it is believed that quat free STPs in accordance with the present disclosure are relatively more moisture activatable due to their relatively increased moisture uptake potential, which may in turn result in a faster activation of the quat free STPs as increasing amounts of peracetic acid precursors, TAED and hydrogen peroxide for example, are dissolved and react.

Stability of exemplary STPs and comparative powders may be demonstrated using accelerated stability models that are characterized by relatively harsh testing conditions. The accelerated stability models described herein are used to measure changes in the percentage of the actives that are present in exemplary STPs as well as in comparative powders. It is believed that the maintenance of active concentrations over time is indicative of the stability of the actives in the samples that are tested using the accelerated stability models, which is further indicative of shelf stability of powdered compositions under relatively normal conditions.

Using an accelerated stability model, hydrogen peroxide concentration in samples of exemplary STPs and comparative powders, is undertaken as follows. Each sample to be tested is placed into an environmental chamber that is set to, and maintains, an internal temperature of 40° C. and an internal relative humidity of 60%. At evenly spaced intervals (usually, about 1 week), the samples are taken from the chamber and allowed to cool to room temperature. A portion of each sample is obtained and dissolved in dilute sulfuric acid having a temperature of 35-40° C.

The percentage of hydrogen peroxide content is determined using an aliquot of each diluted sample via cerimetric titration using the following equation:

$$\%H_2O_2 = \frac{\left(\text{Normality Ce(SO}_4)_2, \frac{eq}{L}\right) \times \left(\frac{17.01 \text{ g H}_2O_2}{1 \, eq}\right) \times (\text{Volume Ce(SO}_4)_2, \text{mL})}{(\text{Sample Mass, g}) \times \left(1000 \frac{\text{mL}}{L}\right) \times \left(\frac{\text{mL aliquot}}{\text{mL dilution}}\right)} \times 100\%$$

The results are set forth for exemplary STPs in accordance with Examples 1-4 and Comparative Examples 1-3 in Table 5:

TABLE 5

| | % Hydrogen Peroxide Remaining under Accelerated Conditions | |
|---|---|---|
| | 4 Weeks | 8 Weeks |
| Ex. 1 | 99.0 | 93.3 |
| Ex. 2 | 97.8 | 97.8 |
| Ex. 3 | 75.8 | 56.5 |
| Ex. 4 | 81.9 | — |
| Comparative Ex. 1 | 92.1 | 88.1 |
| Comparative Ex. 2 | 48.3 | — |
| Comparative Ex. 3 | — | — |

Figure 3:
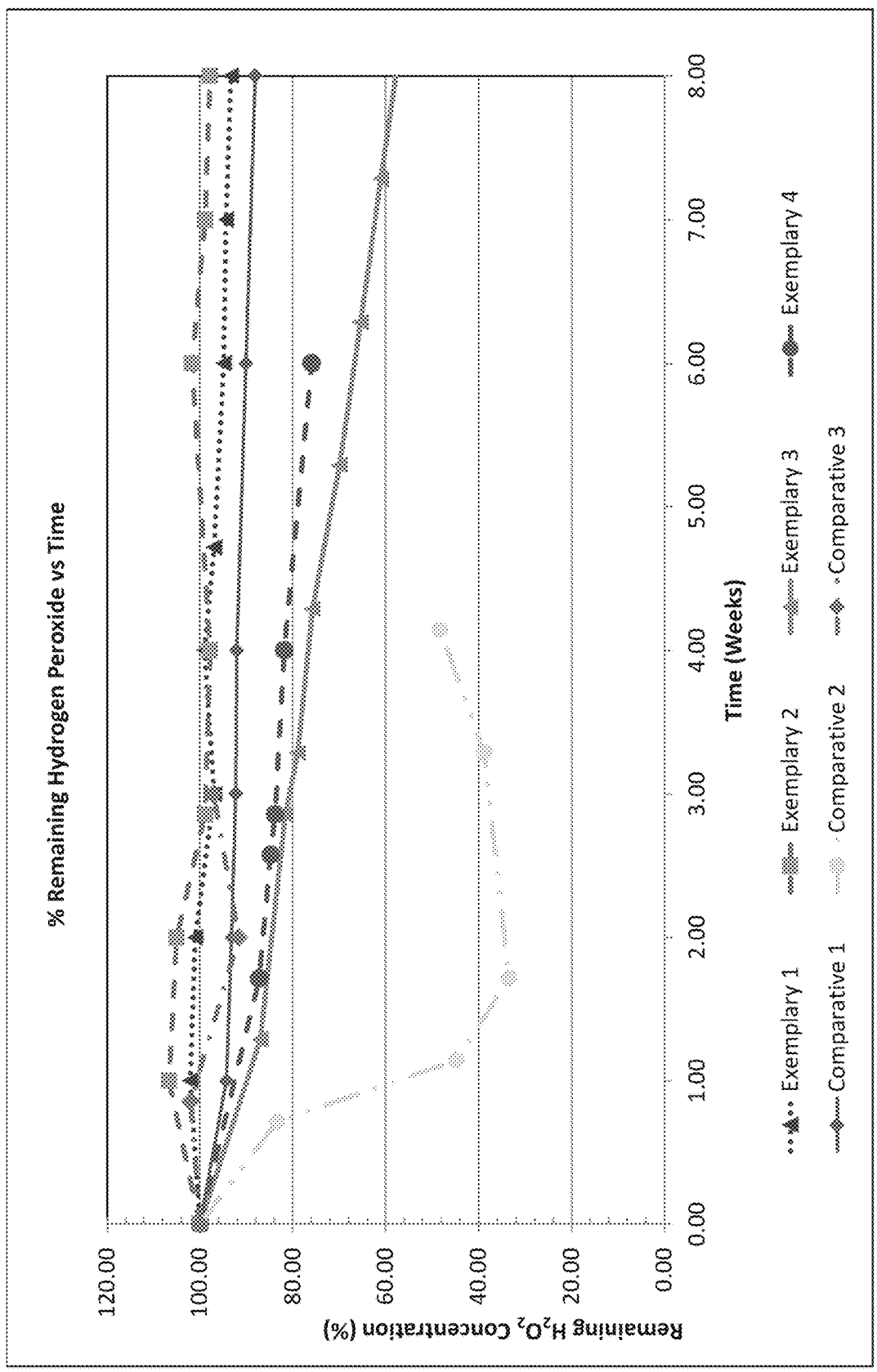
FIG. 3 depicts a plot of remaining hydrogen peroxide vs. time in exemplary surface treatment powders and comparative powders.

A plot of the remaining percentage of hydrogen peroxide for each sample at discrete time points over a period of up to 8 weeks is set forth in FIG. 3. Regardless of the hydrogen peroxide concentration at the beginning of the study (i.e. at time equals 0 weeks), all starting hydrogen peroxide concentrations are normalized to 100% in FIG. 3, so that any changes over time in the remaining percentages of hydrogen peroxide are in relation to the normalized starting concentration for each sample. In the event that a rapid depletion of the remaining percentage of hydrogen peroxide is observed prior to 8 weeks, measurement of the remaining percentage of hydrogen peroxide is halted at that time. With regard to Example 4, measurement of hydrogen peroxide is halted due to a lack of remaining sample material.

Further referencing FIG. 3, the accelerated hydrogen peroxide stability data for samples of exemplary STPs in accordance with Examples 1, 2 and 3 is shown. As can be seen in FIG. 3, Examples 1 and 2 are characterized by a remaining percentage of hydrogen peroxide of above 90% for eight weeks even under the conditions of accelerated stability testing at an internal temperature of 40° C. and an internal relative humidity of 60%. Without wishing to be bound by theory, it is believed that these data demonstrate that the exemplary compositions per Examples 1 and 2 are likely to remain shelf stable with respect to hydrogen peroxide concentration under relatively normal conditions for up to about two years. Notably, these results are similar, if not better, than those that are achieved with respect to Comparative Example 1 (less than 90% after 8 weeks), which is a commercially available quat containing powder.

Without wishing to be bound by theory, it is also believed that FIG. 3 shows that the aforementioned exemplary quat free STPs may maintain their hydrogen peroxide stability without requiring the use of a binding system comprising anionic surfactant(s) despite the fact that the compositions of the exemplary quat free STPs constitute a highly oxidative environment.

Further referencing FIG. 3, the impact of substantially increasing PEG binder content on exemplary STPs is demonstrated. It had been expected that coating moisture sensitive active ingredients in exemplary powders with increasing amounts PEG, would destabilize hydrogen peroxide contained in the exemplary powders. Referencing FIG. 3, the hydrogen peroxide stability of Examples 1 and 2 appears to be roughly the same, even though Example 1 contains about 5 times more PEG binder than the otherwise similarly formulated Example 2. These results are surprising, because it is believed that one of ordinary skill in the art would have assumed that by coating moisture sensitive active ingredients with increasing amounts of hydrophilic and hygroscopic materials such as PEG, water would have been more easily adsorbed and diffused into the active ingredients through liquid bridging facilitated by the PEG, thereby destabilizing the hydrogen peroxide contained in the exemplary powder. Yet, the results of FIG. 3 surprisingly show that that substantially increasing PEG content has little impact on hydrogen peroxide stability, while still providing for a flowable powder.

Further referencing FIG. 3, the impact of using certain flow/anticaking agents in exemplary STPs is shown. Examples 1 and 2 contain calcium stearate as the sole flow/anticaking agent, whereas Example 3 contains silica (i.e., Sipernat D13) in addition to calcium stearate. As can be seen in FIG. 3, the presence of silica in Example 3 decreases the hydrogen peroxide stability of Example 3 as compared to the hydrogen peroxide stability of Examples 1 and 2. Without wishing to be bound by theory, it is believed that since the silica in Example 3 is highly porous, it readily adsorbs moisture from the environment and from other components that are present in the exemplary STP. It is also believed that since silica is much smaller than other hygroscopic particles that are present in the exemplary STPs, e.g., citric acid, the silica coats the other hydroscopic particles and as a result, the silica adsorbs moisture that would otherwise be adsorbed by the hygroscopic particles. It is also believed that, as a result of its size, silica coats particle containing PAA precursors that are present in the exemplary STP, and keeps moisture trapped in close proximity to the PAA precursors TAED and sodium percarbonate, allowing for the PAA precursors to more readily dissolve and react to produce PAA in situ. As a result, the shelf stability of exemplary STPs containing silica as compared to those that do not contain silica may decrease, yet the ambient moisture activatability is relatively increased.

Based upon the foregoing, it is believed that exemplary STPs that comprise silica as a flow/anticaking agent alone or in addition to other flow/anticaking agents that have a high moisture adsorption potential that is common in porous silicas such as those described herein, more readily generate peracetic acid from the reaction of acyl group donors, e.g., TAED, with hydrogen peroxide as compared to exemplary STPs that do not comprise the aforementioned flow/anti-caking agents. Accordingly, when applied as a dry powder, the exemplary STPs have a relatively enhanced capacity to be ambient moisture activated. Thus, the concentration of the hydrogen peroxide, and by extension the remaining percentage of hydrogen peroxide, is relatively reduced in Example 3 at around 75% at 4 weeks and 60% at eight weeks, as compared to the exemplary STPs of Examples 1 and 2, which do not comprise silica and retain a remaining percentage of hydrogen peroxide of about 90% or greater at eight weeks. However, given that the remaining percentage of hydrogen peroxide of Example 3 is measured under an accelerated stability model at an internal temperature of 40°

C. and an internal relative humidity of 60%, it is believed that under normal conditions, the remaining percentage of hydrogen peroxide, and by extension the shelf stability of an exemplary STP that like Example 3 comprises silica and/or other similar flow/anticaking agents, will remain relatively stable for at least 1 year.

Figure 4:
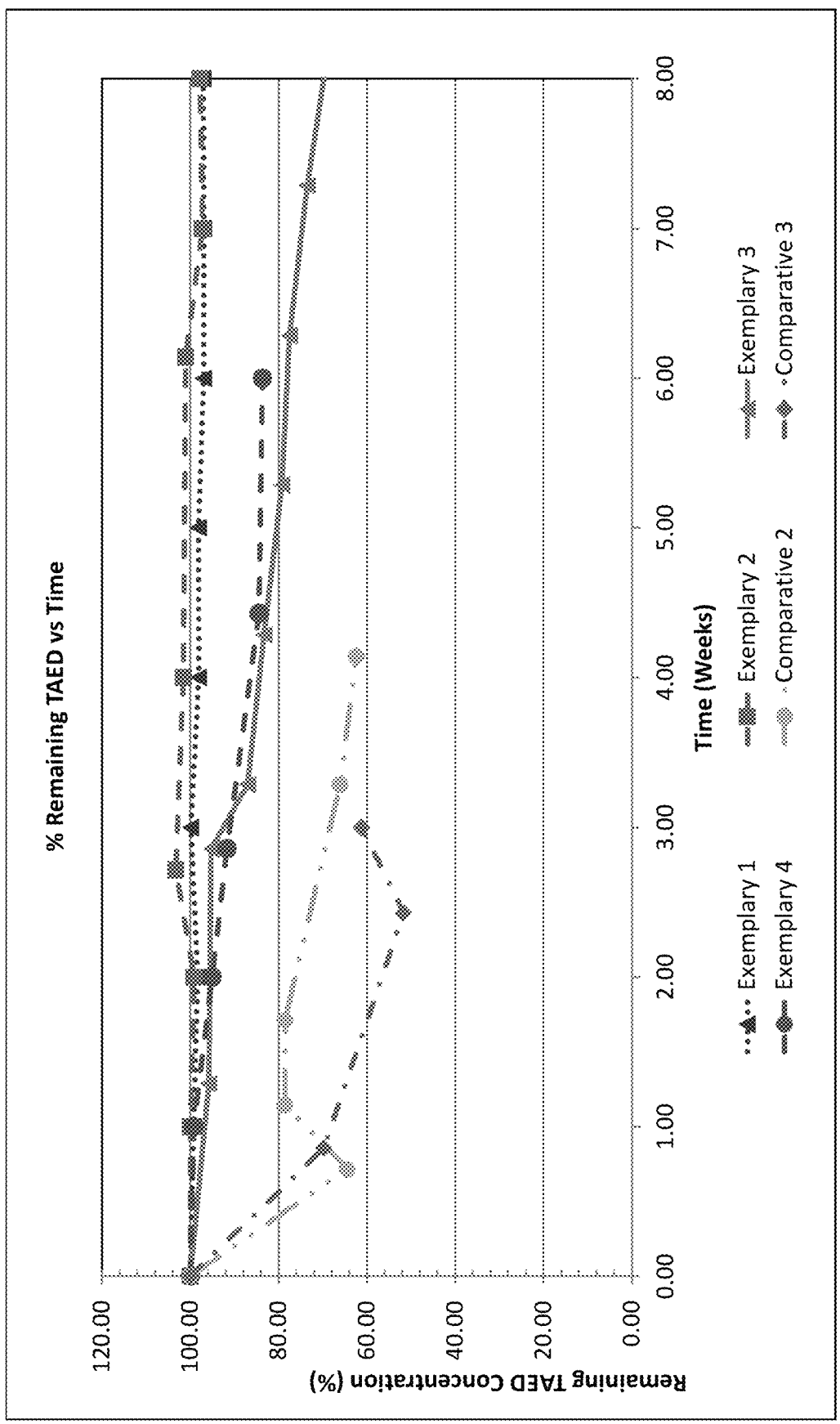
FIG. 4 depicts a plot of remaining TAED vs. time in exemplary surface treatment powders and comparative powders.

FIG. 3 also contains accelerated hydrogen peroxide stability data for Example 4, and for Comparative Examples 2 and 3. As can be seen in FIG. 3, Example 4 is characterized by a hydrogen peroxide concentration of about 82% at four weeks. Measurement of the remaining percentage of hydrogen peroxide is halted after six weeks due to insufficient sample material. As can be further seen in FIG. 3, Comparative Example 2 is characterized by a hydrogen peroxide concentration of less than 50% at four weeks. Measurement of the remaining percentage of hydrogen peroxide is halted at four weeks due to the rapid decline in hydrogen peroxide concentration seen previously. It can be further seen in FIG. 3 that Comparative Example 3, with the replacement of citric acid for sodium bisulfate as an acidity source, shows a relatively stable hydrogen peroxide stability of about 97% at three weeks. However, the measurement of the remaining percentage of hydrogen peroxide is halted at three weeks due to the rapid decline in TAED at three weeks, as shown in FIG. 4 below. Without wishing to be bound by theory, it is believed that that the following may be surmised, based upon these results.

First, it is believed that the relatively rapid depletion of hydrogen peroxide, and by extension, the reduced stability of Comparative Example 2, is due to the use of bicarbonate salt as an alkalinity source in the powder. It is also believed that the sodium bicarbonate releases water into the powder as a byproduct of acid-base neutralization with a small amount of peracetic acid that is naturally formed as the sample ages, and that this release of water will cause more peracetic acid to form and react with bicarbonate salt, releasing even more water into the powder. It is also believed that the collective cyclical acid-base neutralization and subsequent release of water into the powder accounts for the decrease stability of hydrogen peroxide in Comparative Example 2. Thus, FIG. 3 suggests that exemplary STPs that are substantially free of bicarbonate salt(s) may be more shelf-stable with as compared to Comparative Examples that contain sodium bicarbonate.

Second, it is believed that the hydrogen peroxide stability of Example 4, which contains citric acid, at least partially negates the impact of sodium bicarbonate on hydrogen peroxide stability that is observed in relation to Comparative Example 2. This result is surprising, since one of ordinary skill in the art would expect citric acid to react similarly to PAA that is present in an exemplary STP, and generate a cyclic water release as described above.

Third, even though the hydrogen peroxide stability data for Example 4 ceases at about 6 weeks, it is believed that under relatively normal conditions, the remaining percentage of hydrogen peroxide, and by extension the shelf stability of the exemplary STP according to Exemplary Composition 4 will remain relatively stable for as much as 1 year.

Using an accelerated stability model, TAED concentration in samples of exemplary STPs and comparative powders, is undertaken as follows. To test accelerated stability of TAED in a powder, a sample of one or more exemplary STPs and/or comparative powders are placed into an environmental chamber that is set to, and maintains, an internal temperature of 40° C. and an internal relative humidity of 60%. At evenly spaced intervals (usually 1 week), the samples are taken from the chamber and allowed to cool to room temperature.

TAED content is determined by using reverse-phase HPLC that is equipped with a diode array detector (measuring at 215 nm) and is capable of gradient elution. TAED calibration standards and STP samples are prepared with a 1.05 M phosphate buffer (pH 2.7). Analysis is run under gradient elution with a phosphate buffer:acetonitrile mobile phase as described in Table 6 using a C18 column (5 µm, 150 mm×4.6 mm) with a total analysis time of 15 minutes and expected retention time of 8.6 minutes.

TABLE 6

| Time (minutes) | 1.05M Phosphate Buffer | Acetonitrile |
| --- | --- | --- |
| 0 | 90 | 10 |
| 4 | 90 | 10 |
| 8 | 50 | 50 |
| 12 | 50 | 50 |
| 12.01 | 90 | 10 |
| 15 | 90 | 10 |

Table 7 contains the TAED content for exemplary STPs in accordance with Examples 1-4 and Comparative Examples 2 and 3:

TABLE 7

| | % TAED Remaining under Accelerated Conditions | |
| --- | --- | --- |
| | 4 Weeks | 8 Weeks |
| Ex. 1 | 98.1 | 97.1 |
| Ex. 2 | 101.6 | 97.8 |
| Ex. 3 | 83.3 | 68.3 |
| Ex. 4 | 84.5 | — |
| Comparative Ex. 2 | 62.4 | — |
| Comparative Ex. 3 | — | — |

A plot of the remaining percentage of TAED for each sample at discrete time points over a period of up to 8 weeks is set forth in FIG. 4. Regardless of the TAED concentration at the beginning of the study (i.e. at time equals 0 weeks), all starting TAED concentrations are normalized to 100% in FIG. 4, so that any changes over time in the remaining percentages of TAED are in relation to the normalized starting concentration for each sample. In the event that a rapid depletion of the remaining percentage of TAED and/or Hydrogen Peroxide as described above is observed prior to 8 weeks, measuring the remaining percentage of TAED is halted. It is to be noted that Comparative Example 1 is not tested for TAED stability since it does not contain TAED.

As can be seen in FIG. 4, the results for accelerated TAED stability are similar to those relating to hydrogen peroxide stability for exemplary STPs compositions in accordance with Examples 1-4 and Comparative Example 2. The notable exception is the TAED stability associated with Comparative Example 3. As noted above in relation to hydrogen peroxide stability, when sodium bisulfate is used as an acidity source in replacement of citric acid, hydrogen peroxide stability remains relatively stable. Yet, FIG. 4 shows that the remaining percentage of TAED is about 61% at three weeks for Comparative Example 3. Accordingly, it is believed that the release of sulfuric acid, a strong acid, from the sodium bisulfate in an aqueous solution has a strong negative effect on the stability of TAED. This is further supported by the appearance of a sulfurous odor after only a short time in storage, indicating volatile sulfur-containing degradation products.

As can also be seen in FIG. 4, the use of a silica like Sipernat D13 as a flow/anticaking agent in Exemplary Composition 3 has an impact on TAED stability that is similar to its impact on hydrogen peroxide stability. Without wishing to be bound by theory, it is believed that the same theoretical mechanism of moisture adsorption by silica that is explained above in relation to reducing the remaining percentage of hydrogen peroxide, also reduces the remaining percentage of TAED as compared to exemplary STPs which do not include silica as a flow/anticaking agent. As a result, an exemplary STP that comprises silica as a flow/anticaking agent has an enhanced ability to be ambient moisture activated such that it facilitates the reaction of hydrogen peroxide and TAED to produce peracetic acid. Accordingly, although exemplary STPs containing silica may have a shorter shelf life under relatively normal conditions as compared to other non-silica containing STPs, such silica containing STPs are relatively more ambient moisture activatable. As such, silica containing STPs may be especially useful in dry environments that are characterized by extremely low relative humidity. Other exemplary silica-based flow/anticaking agents disclosed herein will provide for similar results.

Effective treatment of a surface with an exemplary ambient moisture-activated STP without the addition of liquid water, but rather ambient moisture (e.g., water vapor), may be measured using a modified version of ASTM E1153-14 "Standard Test Method for Efficacy of Sanitizers Recommended for Inanimate, Hard, Nonporous Non-food Contact Surfaces" (Version No. 14, published in May of 2014 and editorially corrected in June of 2020), which is described as follows. The test organisms are *Staphylococcus aureus* ATCC 6538 and *Klebsiella aerogenes* ATCC 43175. The test organisms are prepared by growth in liquid culture. Sterilized stainless steel carriers are inoculated with the test culture over a 5-inch×5-inch area. The carriers are dried completely in an incubator at 37° C.+/−2° C. for 40 minutes. Test carriers are treated with 38.5 g of the exemplary STP. Test carriers are incubated for a contact time of 24 hours, and at a relative humidity of 50%. Control carriers treated with a buffered saline solution are incubated in parallel with the test carriers. After the treatment contact time, test and control carriers are chemically neutralized with 100 mL of Dey Engley neutralizing broth. The neutralized carriers are evaluated for growth to determine the surviving microorganisms. The enumeration plates are incubated under aerobic conditions for 24-48 hours at 36° C.+/−1° C. The enumeration count on carriers treated with the test substance is subtracted from the enumeration count on control carriers incubated at the same relative humidity and contact time to determine microbial log reductions. The effect of treatment with exemplary STPs in accordance with Example 1 and Example 9 is measured, and the log reduction results are set forth in Table 8.

TABLE 8

Ambient Moisture Activation Efficacy Results

| Example | Organism | Log Reduction |
|---|---|---|
| Ex. 1 | *S. aureus* ATCC 6538 | 3.09 |
|  | *K. aerogenes* ATCC 13048 | 3.12 |

TABLE 8-continued

Ambient Moisture Activation Efficacy Results

| Example | Organism | Log Reduction |
|---|---|---|
| Ex. 9 | *S. aureus* ATCC 6538 | 3.09 |
|  | *K. aerogenes* ATCC 13048 | 3.12 |

Residual antimicrobial efficacy under simulated "in-use" practices of exemplary STPs and comparative powders may be measured as follows. The protocol for measuring residual antimicrobial efficacy of powders is undertaken using the "Protocol for Residual Self-Sanitizing Activity of Dried Chemical Residues on Hard Nonporous Surfaces," Protocol #01-1A (Created on Sept. 5, 2002 and available at: https://www.epa.gov/sites/default/files/2015-09/documents/cloroxpcol_final.pdf), which is modified as follows to accommodate the testing of a dry powder product rather than a dried liquid product.

Cultures of *Staphylococcus aureus* ATCC 6538 and *Klebsiella aerogenes* ATCC 13048 are grown per Protocol #01-1A. Each organism inoculum is separately applied to stainless steel 127×127 mm coupons and allowed to dry. A sample of a powder to be tested is subsequently spread evenly across each test coupon. A set of corresponding inoculated control coupons do not receive application of the STP. Both test and control coupons are subjected to alternating dry and wet wear cycles with a stamp for a total 24 hours of STP contact time according to Table 9 and a total of 48 hours of STP contact time according to Table 10.

TABLE 9

| Steps |
|---|
| 1. Initial inoculation with test organism(s) |
| 2. Inoculum is dried onto coupons |
| 3. Apply test product |
| 4. Wear cycle without any DI water (wear #1) |
| 5. Re-inoculation with test organism(s) |
| 6. Wait at least 30 minutes after re-inoculation |
| 7. Wear cycle with spray (wear #2) |
| 8. Re-inoculation with test organism(s) |
| 9. Wait at least 30 minutes after re-inoculation |
| 10. Repeat steps 3-8 until a total of 9 alternating dry and wet wear cycles are achieved |
| 11. Re-inoculation with test organism(s) |
| End of First Day |
| 12. Repeat alternating wear cycles starting with a dry cycle until a total of 12 are achieved (6 dry and 6 wet combined from both test days) |
| 13. Re-inoculation with test organism(s) |
| 14. Sanitizer test performed at 24 hours after application of test product |
| 15. Test coupons in triplicate after 5 minutes - for each organism tested |

TABLE 10

| Steps |
|---|
| 1. Initial inoculation with test organism(s) |
| 2. Inoculum is dried onto coupons |
| 3. Apply test product |
| 4. Wear cycle without any DI water (wear #1) |
| 5. Re-inoculation with test organism(s) |
| 6. Wait at least 30 minutes after re-inoculation |
| 7. Wear cycle with spray (wear #2) |
| 8. Re-inoculation with test organism(s) |
| 9. Wait at least 30 minutes after re-inoculation |

TABLE 10-continued

10. Repeat steps 3-8 until a total of 9 alternating dry and wet wear cycles are achieved
11. Re-inoculation with test organism(s)
    End of First Day 12. Repeat alternating wear cycles starting with a wet cycle until a total of 12 are achieved
13. Re-inoculation with test organism(s)
    End of Second Day 14. Repeat alternating wear cycles after 24 hours from the last reinoculation starting with a dry cycle until a total of 16 are achieved (8 dry and 8 wet combined over three days)
15. Sanitizer test performed at 48 hours after application of test product
16. Test coupons in triplicate after 5 minutes - for each organism tested For each wear step, a large, custom rocker stamp comprising a raised boot tread, is pressed onto the inoculated treated or untreated coupon with a force of about 20 lbs, measured by a balance, simulating the disturbance and/or removal of portions of applied exemplary STPs by the mechanical action of walking/stepping. For wet wear cycles, a standard misting spray bottle is used to moisten the boot tread of the rocker stamp prior to pressing the stamp onto the treated and untreated coupons. After each wear cycle, 30 minutes prior to the next cycle, treated and untreated coupons are re-inoculated with bacteria. Cycles are repeated, alternating between wet and dry, according to Table 9 for an STP contact time of 24 hours and Table 10 for an STP contact time of 48 hours. Inoculation and performance of the sanitizer efficacy test are then completed per Protocol #01-1A. A passing result is considered to be greater than or equal to a 3 log 10 reduction in bacteria (CFU/coupon) compared to the control count.

Residual antimicrobial efficacy of an exemplary STP per Example 1 is measured as described above. The resulting data are shown in Table 11 and plotted in FIG. 5.

TABLE 11[4]

| Organism | Use Rate (grams STP/coupon) | Time (Hours) | Log Reduction |
|---|---|---|---|
| *Staphylococcus aureus* ATCC 6538 | 3 | 24 | 5.61 |
| *Klebsiella aerogenes* ATCC 13048 | 3 | 24 | 6.07 |
| *Staphylococcus aureus* ATCC 6538 | 12 | 48 | 5.08 |
| *Klebsiella aerogenes* ATCC 13048 | 12 | 48 | 5.66 |

Figure 6:
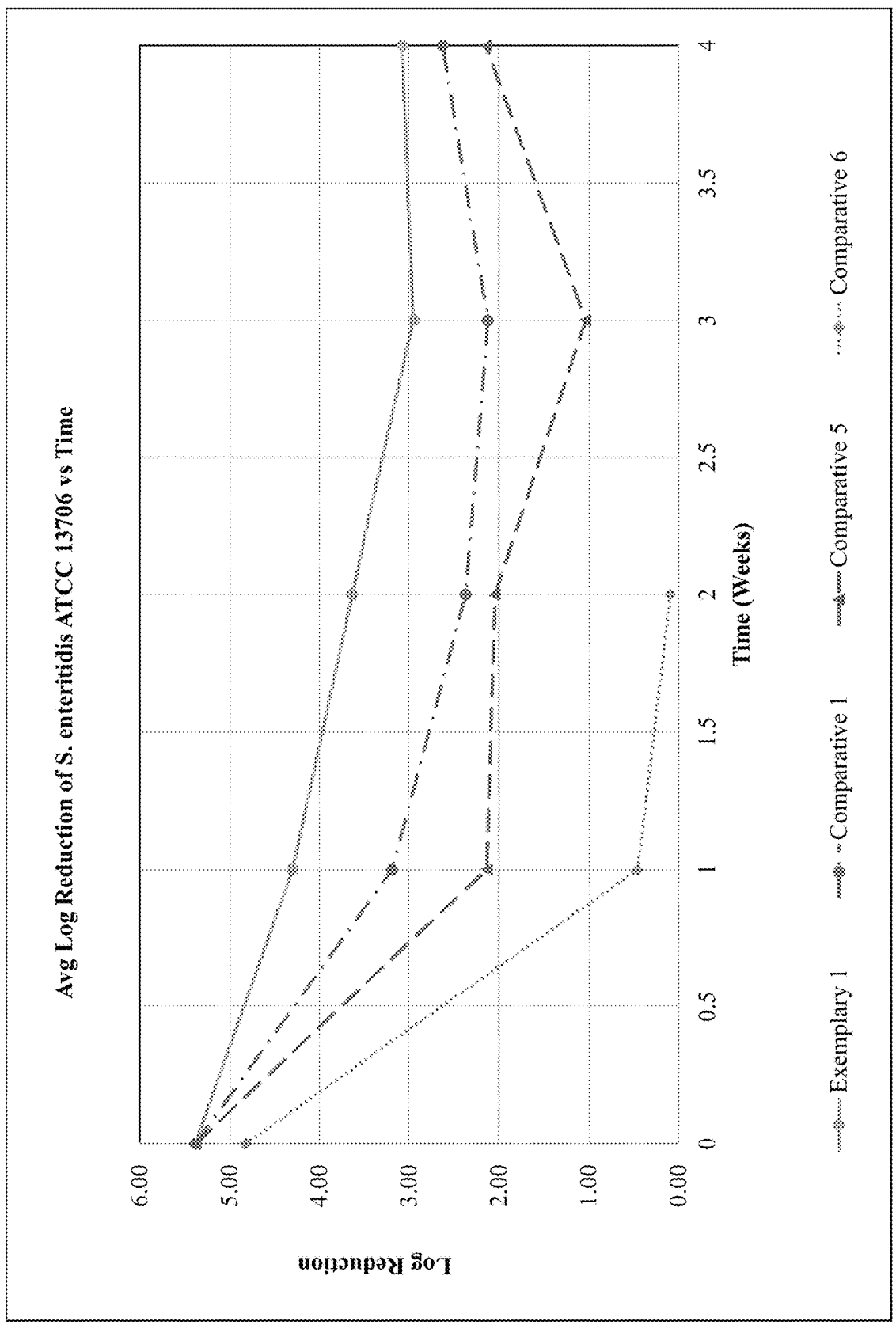
FIG. 6 depicts a plot of log reductions of bacterial counts of *Staphylococcus* Enteritidis ATCC 13706 after treatment with an exemplary surface treatment powder and comparative powders.

[4]Two separate studies are reflected in Table 12 and FIG. 6 - one study for 24 hours and another study for 48 hours.

Figure 5:
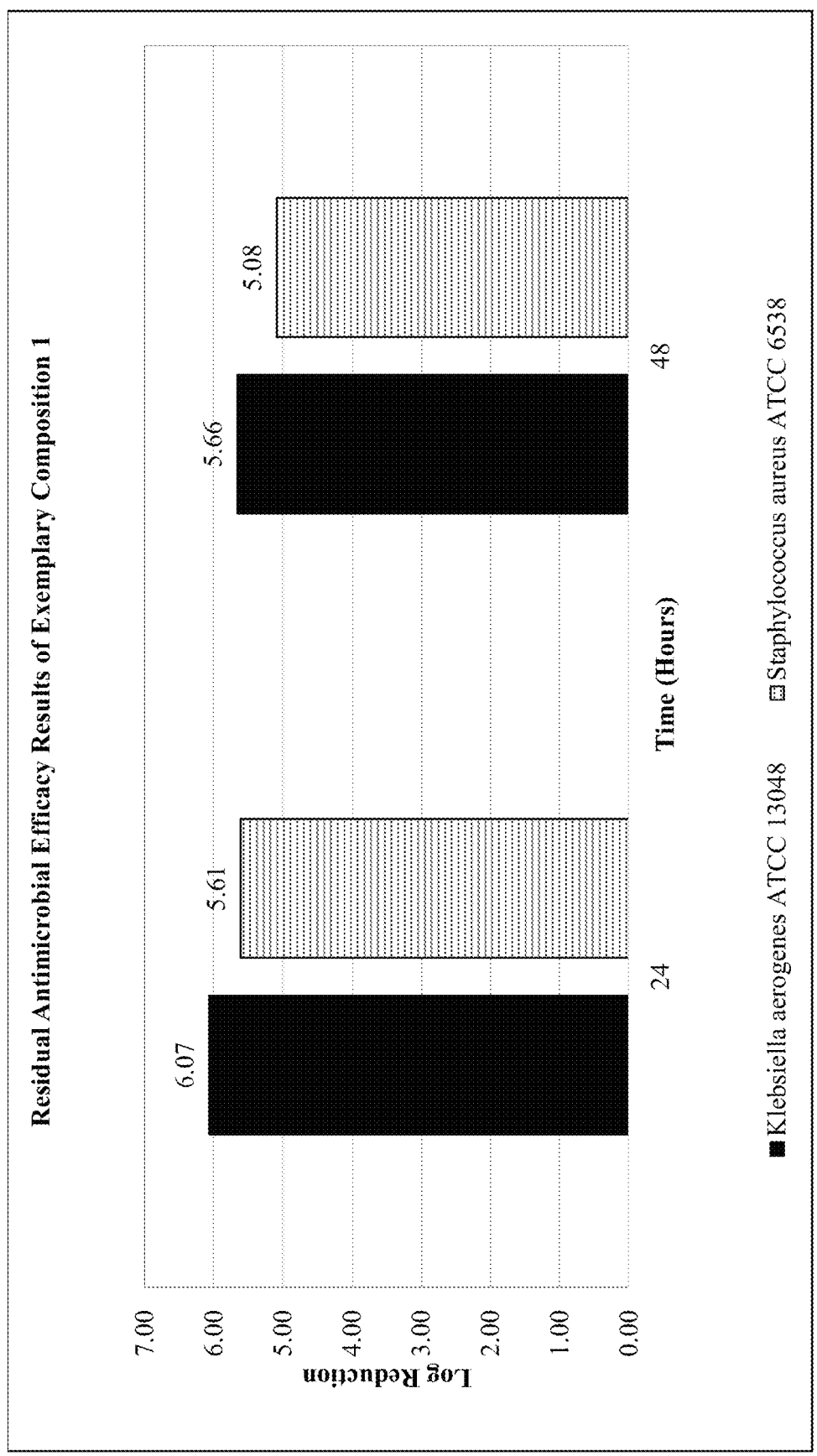
FIG. 5 depicts a plot of log reductions of bacterial counts of *Klebsiella aerogenes* ATCC 13048 and *Staphylococcus aureus* ATCC 6538 at 24 and 48 hours after treatment with an exemplary surface treatment powder.

As can be seen in Table 11 and FIG. 5, an exemplary quat free STP in accordance with Example 1, is effective against bacteria when applied to a surface as a dry powder and exposure to moisture occurs as it would if the exemplary STP were contacted with footwear having water (e.g., by an individual walking through the powder which is applied on a floor mat, in a floor pan, on a floor, etc.). Furthermore, Table 11 and FIG. 5 demonstrate the ability of the exemplary quat free STP to remain efficacious over extended periods of time under a continuous microbial load and exposure to ambient moisture. It is believed that the results of this study can be extrapolated to other exemplary STPs.

A 24-hour residual antimicrobial efficacy study is conducted against *Staphylococcus aureus* ATCC 6538 in order to compare exemplary STPs in accordance with Examples 1 and 3. The resulting data are set forth in Table 12.

TABLE 12

Residual Antimicrobial Efficacy against *Staphylococcus aureus* ATCC 6538

| Exemplary Composition | Use Rate (grams STP/coupon) | Time (Hours) | Log Reduction |
|---|---|---|---|
| 1 | 3 | 24 | 3.92 |
| 3 | 3 | 24 | 4.69 |

[5] The formulations of the commercially available powdered sanitizers in TABLE 2 are approximated based upon publicly available information relating thereto (e.g., Material Safety Data Sheets, Regulatory Applications, labeling, etc.).

As can be seen in Table 12, both exemplary compositions achieve greater than or equal to a 3-log 10 reduction in bacteria (CFU/coupon). In addition, it is evident that Example 3 achieves a significantly larger reduction in bacteria compared with Example 1. Without wishing to be bound by theory, it is believed that the increased ambient moisture activation and contribution of the addition of a silica flow/anticaking agent, allows for greater moisture uptake by Example 3 as compared to Example 1 over the same contact time. Thus, Example 3 provides for a relatively greater ambient moisture activation of the peracetic acid antimicrobial agent.

As noted above, some exemplary methods comprise treatment of footwear with exemplary STPs and those methods comprise dispensing an exemplary STP into a foot pan or onto any other surface where people walk (e.g., a floor, in a doorway, stairwell etc.). Such usage of exemplary STPs exposes them to harsh conditions (for example, conditions common in entrances/exits to/from manufacturing facilities, barns, etc.). To demonstrate the relative longevity of active components in, and the antimicrobial efficacy of, exemplary STPs, as compared to selected EPA-registered and nonregistered powdered sanitizers,[5] samples of the foregoing are exposed to elevated temperature, humidity and soiling and evaluated as follows.

An exemplary STP in accordance with Example 1 and commercially available powder sanitizers with differing biocidal actives are evaluated, including: Comparative Example 1, Comparative Example 5 and Comparative Example 6. 2000 g quantities of each powder sanitizer are dispensed into foot pans in triplicate and subjected to environmental conditions in an enclosed outdoor shelter for 4 weeks. Temperature and relative humidity are recorded. Autoclaved composted manure is added daily with a resulting cumulative soil concentration of 1% by weight of each of the powder samples at the end of three weeks. Each powder is sampled weekly and analyzed for active ingredient concentrations using the appropriate test strips that correspond to the active(s) in a given sample. Additionally, each powder is subjected to the ASTM E1153-14 "Standard Test Method for Efficacy of Sanitizers Recommended for Inanimate, Hard, Nonporous Non-food Contact Surfaces" (Version No. 14, published in May of 2014 and editorially corrected in June of 2020) assay against *Staphylococcus* Enteritidis ATCC 13706 at a dose rate of 37 g/L.

Noting that the average maximum temperature and relative humidity throughout the study are respectively 82±11° F. and 84±6%, data are collected on a weekly basis, the remaining percentage of antimicrobial active(s) is calculated and the results are collected in Tables 13 and 14, and the data in Table 14 is plotted in FIG. 6. Regardless of the antimicrobial active(s) concentration at the beginning of the study (i.e. at time equals 0 weeks), all starting antimicrobial active(s) concentrations are normalized to 100% in Table 13, so that any changes over time in the remaining percentages of antimicrobial active(s) are in relation to the normalized starting concentration for each sample. In the event that a rapid depletion of the remaining percentage of antimicrobial active(s) is observed prior to 4 weeks, measuring the remaining percentage of antimicrobial active(s) is halted.

TABLE 13

| | | Time (Weeks) | | | | |
|---|---|---|---|---|---|---|
| | | 0 | 1 | 2 | 3 | 4 |
| Ex. 1 | % active Peracetic Acid | 100.00 | 100.00 | 80.00 | 70.00 | 63.33 |
| Comparative Ex. 1 | % active Quaternary Ammonium Compound | 100.00 | 77.78 | 66.67 | 62.22 | 53.33 |
| | % active Hydrogen Peroxide | 100.00 | 90.91 | 90.91 | 83.33 | 60.61 |
| Comparative Ex. 5 | % active Hydrogen Peroxide | 100.00 | 90.91 | 68.18 | 45.45 | 45.45 |
| Comparative Ex. 6 | % active Chlorine | 100.00 | 0.00 | 0.00 | — | — |

TABLE 14

Bacterial Log Reductions of Exemplary and Comparative Powders over Time

| | | Weeks | | | | |
|---|---|---|---|---|---|---|
| | Rep # | 0 | 1 | 2 | 3 | 4 |
| Ex. 1 | 1 | 5.38 | 3.87 | 3.12 | 2.84 | 3.12 |
| | 2 | 5.38 | 4.19 | 3.60 | 2.75 | 3.37 |
| | 3 | 5.38 | 4.83 | 4.19 | 3.27 | 2.75 |
| | Avg | 5.38 | 4.30 | 3.64 | 2.95 | 3.08 |
| | Std Dev | 0.00 | 0.49 | 0.54 | 0.28 | 0.31 |
| Comparative Ex. 1 | 1 | 5.38 | 3.12 | 2.18 | 2.20 | 2.53 |
| | 2 | 5.38 | 3.44 | 2.36 | 1.96 | 2.72 |
| | 3 | 5.38 | 3.00 | 2.56 | 2.20 | 2.63 |
| | Avg | 5.38 | 3.19 | 2.37 | 2.12 | 2.63 |
| | Std Dev | 0.00 | 0.23 | 0.19 | 0.14 | 0.09 |
| Comparative Ex. 5 | 1 | 5.38 | 2.45 | 2.00 | 1.08 | 1.43 |
| | 2 | 5.38 | 1.05 | 1.97 | 0.98 | 2.63 |
| | 3 | 5.38 | 2.90 | 2.16 | 1.04 | 2.39 |
| | Avg | 5.38 | 2.14 | 2.04 | 1.04 | 2.15 |
| | Std Dev | 0.00 | 0.96 | 0.10 | 0.05 | 0.63 |
| Comparative Ex. 6 | 1 | 5.31 | 0.45 | 0.20 | | |
| | 2 | 4.59 | 0.47 | 0.03 | | |
| | 3 | 4.56 | 0.43 | 0.04 | | |
| | Avg | 4.82 | 0.45 | 0.09 | | |
| | Std Dev | 0.43 | 0.02 | 0.10 | | |

As can be seen in Tables 13 and 14, and in FIG. 6, the active chlorine of Comparative Example 6 rapidly degrades after 1 week, and fails to achieve a required 3-log reduction for sanitization. Comparative Example 5 also fails to achieve a 3-log reduction after 1 week. Comparative Example 1 achieves a 3-log reduction after 1 week but fails to achieve a 3 log reduction again at week 2. In contrast, the exemplary composition in accordance with Example 1 achieves a 3-log reduction throughout the entire study. Without wishing to be bound by theory, it is believed that these results demonstrate that exemplary quat free STPs provide for better long term biocidal activity than the Comparative Examples, which include commercially available powders that are EPA-registered and undergo rigorous and validated testing to maintain active ingredient integrity and efficacy against S. Enteritidis, despite exposure to high temperature and humidity.

Sanitization efficacy of exemplary STPs and comparative powders may be undertaken using ASTM E1153-14 "Standard Test Method for Efficacy of Sanitizers Recommended for Inanimate, Hard, Nonporous Non-food Contact Surfaces" (Version No. 14, published in May of 2014 and editorially corrected in June of 2020). Sanitization efficacy of an exemplary STP in accordance with Example 1 and Comparative Example 1 is measured and the results are compiled in Table 15.

TABLE 15

Sanitization Log Reduction

| Organism | Exemplary Composition 1 11 g/L | Comparative Example 1 37 g/L |
|---|---|---|
| S. aureus ATCC 6538 | 5.12 | 4.77 |
| K. aerogenes ATCC 13048 | 4.99 | 5.26 |
| S. Enteritidis ATCC 13076 | 4.01 | >3.0 |
| E. coli ATCC 11229 | 3.91 | >3.0 |
| L. monocytogenes ATCC 15313 | 3.95 | >3.0 |
| S. enterica ATCC 10708 | 4.00 | >3.0 |
| C. sakazakii ATCC 29004 | 3.74 | >3.0 |
| C. jejuni ATCC 29428 | 4.70 | >3.0 |

Sanitization efficacy of an exemplary STP in accordance with Example 1 and Comparative Example 4 is measured and the results are compiled in Table 16.

TABLE 16

Sanitization Log Reduction of S. aureus ATCC 6538

| Dilution Rate (g/L) | 37 | 26 | 15 | 5 |
|---|---|---|---|---|
| Exemplary Composition 1 | 4.42 | 4.42 | 4.42 | 3.03 |
| Comparative Example 4 | 1.25 | 1.21 | 0.71 | 0.08 |

Disinfection efficacy of exemplary STPs and comparative powders may be undertaken using SOP Number MB-05-14 "AOAC Use Dilution Method for Testing Disinfectants (Date Revised Aug. 11, 2016). Disinfection efficacy of an exemplary STP in accordance with Example 1 and Comparative Example 1 is measured and the results may be seen in Table 17.

TABLE 17

Disinfection Testing

| Product | S. aureus | P. aeruginosa | S. enterica |
|---|---|---|---|
| Exemplary Composition 1 60 g/L | Pass | Pass | Pass |
| Comparative Example 1 200 g/L | Pass | Pass | Pass |

Referencing the data that are tabulated in Tables 15-17, the following may be surmised. First, the sanitization and disinfection efficacy data in Tables 15 and 17 demonstrate that a quat free STP in accordance with the present disclosure is just as effective as a comparable quat containing surface treatment powder. Second, the sanitization and disinfection efficacy data in Tables 15 and 17 further demonstrate that a quat free STP in accordance with the present disclosure may actually be more effective than comparable quat containing powder at sanitization and disinfection, since it takes less of the quat free STP to achieve results that are comparable utilizing more of the quat containing surface treatment powder (i.e., 11 g/L vs. 37 g/L for sanitization and 60 g/L vs. 200 g/L for disinfection). Third, the data in Table 16 demonstrates a remarkably better performance at multiple low dose rates of exemplary quat free STPs in accordance with the present disclosure as compared to a comparative quat free STP that comprises a liquid acyl group donor and about 7 times the sodium percarbonate concentration by weight as compared to the exemplary quat free composition.

Virucidal efficacy of exemplary STPs may be undertaken using ASTM E1053-20 protocol "Standard Practice to Assess Virucidal Activity of Chemicals Intended for Disinfection of Inanimate, Nonporous Environmental Surfaces" (Last updated in March 2020). Virucidal efficacy of an exemplary STP in accordance with Example 1 is measured and the results are compiled in Table 18.

TABLE 18

Virucidal Log Reduction of Exemplary Composition 1

| Virus | 100 g/L | Contact Time (Seconds) |
|---|---|---|
| Avian Influenza A Virus (H5N1) | ≥3.75 | 90 |
| Porcine Epidemic Diarrhea Virus | ≥3.00 | 90 |
| Feline Calicivirus | ≥4.63 | 90 |

The virucidal efficacy data presented in Table 18 demonstrate that an exemplary STP that is quat free is not only bactericidal, but also exhibits remarkable virucidal activity. To wit, not only does the exemplary quat free STP achieve a greater than 3 log reduction of the viral titre, but it does so in 90 seconds, which is well below the 10 minute maximum that is allowable to achieve a 3 log reduction for ASTM E1053 of 10 minutes (OCSPP 810.2200).

Additional Examples
A first example of a hard surface treatment powder comprises:
   (a) a peroxide source;
   (b) an acyl group donor; and
   (c) an alkalinity source;
wherein the hard surface treatment powder has characteristics selected from:
   1) flowable;
   2) ambient moisture activatable;
   3) substantially free of one or more quaternary ammonium compounds;
   4) formulated to have an initial localized pH greater of about 7.0 to about 10.5, from about 7.5 to about 10.0, from about 8.0 to about 9.8, or from about 9.0 to about 9.5, and maintains the initial localized pH when dissolved in whole or in part by water;
   and combinations thereof.

A second example according to the first example, wherein the peroxide source is selected from: percarbonate salt; perborate salt; perphosphate salt; persulfate salt; persilicate salt; peroxide salt; peracetate salt; and combinations thereof.

A third example according to either one of the first or second examples, wherein the peroxide source is selected from: sodium percarbonate; sodium perborate; sodium perphosphate; sodium persulfate; sodium persilicate; sodium peroxide; sodium peracetate; potassium percarbonate; potassium perborate; potassium perphosphate; potassium persulfate; potassium persilicate; potassium peroxide; potassium peracetate; and combinations thereof.

A fourth example according to the first example, wherein the peroxide source has the formula:

$$2(Na_2CO_3) \cdot nH_2O_2$$

wherein n=1, 2 or 3, the "sodium percarbonate" having the hydrogen peroxide of crystallization.

A fifth example according to any one of the preceding examples, comprising by weight percentage of the hard surface treatment powder, one or more peroxide sources in a total amount of from about 1% to about 30%, from about 1% to about 20%, from about 1% to about 10% or from about 3% to about 9.5%.

A sixth example according to any one of the preceding examples, wherein the acyl group donor has the general structure of:

$$R \overset{O}{\underset{}{\diagdown\!\!\!\diagup}} R'$$

wherein R and R' are organyl substituents or hydrogen.

A seventh example according to any one of the preceding examples, wherein the acyl group donor is selected from: compounds comprising an O-acyl moiety ("O-acyl donor"); compounds comprising an N-acyl moiety ("N-acyl donor"); compounds comprising both an O-acyl and N-acyl moiety ("O-, N-donor"); and combinations thereof.

An eighth example according to any one of the preceding examples, wherein the acyl group donor is selected from: N,N,N,N'-tetraacetylmethylenediamine; N,N,N,N'-tetraacetylethylenediamine (TAED); N,N-diacetylaniline; N,N-diacetyl-p-toluidine; 1,3-diacetyl-5,5-dimethylhydantoin; 1,3-dipropionylhydantoin; 3-benzoylhydantoin-1acetic acid ethyl ester; N-methyl-N-mesylacetamide; N-methyl-N-mesylbenzamide; N-methyl-N-mesyl-p-nitrobenzamide; N-methyl-N-mesyl-p-methoxybenzamide; N,N',N'',N'''-tetraacetylglycoluril; N-acyl caprolactams; Sodium nonanoyloxybenzenesulfonate (NOBS); sodium 4-(2-decanoyloxyethoxycarbonyloxy)benzenesulfonate and/or salts thereof (DECOB); lauryloxybenzylsulfonate (LOBS); iso-lauryloxybenzylsulfonate (i-LOBS); benzoyloxybenzylsulfonate (BOBS); decanoyloxybenzylsulfonate (C1 0-OBS); octanoyloxybenzylsulfonate (C8-OBS); 4-[N-(nonanoyl) aminohezanoyloxy]-benzylsulfonate-sodium salt (NACA-OBS); 10-undecenoyloxybenzylsulfonate (UDOBS); ecanoyloxybenzoec acid (DOBA); glyceryl diacetate (Diacetin); glycerine triacetate (triacetin); N-Acetyl-9-O-acetylneuraminic acid; and combinations thereof.

A ninth example according to any one of the preceding examples, comprising by weight percentage of the hard surface treatment powder, one or more acyl group donors in a total amount of from about 0.5% to about 15%, from about 1% to about 10%, from about 1% to about 6% or from about 2% to about 5%.

A tenth example according to any one of the preceding examples, wherein the alkalinity source is selected from: sodium carbonate; sodium bicarbonate; potassium carbonate; lithium carbonate, ammonium carbonate; and combinations thereof.

An eleventh example according to any one of the preceding examples, comprising by weight percentage of the hard surface treatment powder, one or more alkalinity sources in a total amount of from about 1 wt. % to about 85 wt. %, from about 10 wt. % to about 70 wt. %, from about 20 wt. % to about 65 wt. % or from about 30% to about 60%.

A twelfth example according to any one of the preceding examples, further comprising binder.

A thirteenth example according to the twelfth example, wherein the binder is selected from: nonionic surfactants that are substantially free of water (e.g., EO-PO block copolymers, fatty alcohol ethoxylates, alkylpolyglycosides and combinations thereof), mineral oil and/or combinations of higher alkanes; glycols such as polyethylene glycol, propylene glycol and/or ethylene glycol; and combinations thereof.

A fourteenth example according to the twelfth example, wherein the binder is polyethylene glycol having an average molecular weight of from about 200 to about 1,000 g/mol and/or EO-PO block copolymers having an HLB from about 2 to about 9.

A fifteenth example according to the twelfth example, wherein the binder is an EO-PO block copolymers selected from: poloxamer 181, poloxamer 182, poloxamer 331 and combinations thereof.

A sixteenth example according to the twelfth example, wherein the binder comprises one or more alcohols that are insoluble when present in DI water at above 1% (w/vol).

A seventeenth example according to the twelfth example, wherein the binder comprises liquid polyethylene glycol and/or EO-PO block copolymers at from about 0.001% to about 7%, from about 0.01% to about 5.0%, from about 0.05% to about 3%, or from about 0.05% to about 2% by weight percentage of the hard surface treatment powder.

An eighteenth example according to the twelfth example, wherein the binder is polyethylene glycol (PEG) having an average molecular weight of from about 200 to about 1,000 g/mol.

A nineteenth example according to any one of the preceding examples, further comprising an acidity source.

A twentieth example according to the nineteenth example, wherein the acidity source is selected from: formic acid; acetic acid; lactic acid; citric acid; succinic acid: glycolic acid; sulfamic acid; phosphoric acid; propionic acid; hydrochloric acid; the respective sodium salts of any of the foregoing acidity sources; the respective potassium salts of any of the foregoing acidity sources; and combinations thereof.

A twenty-first example according to the twentieth example, wherein the acidity source further comprises sulfuric acid, bisulfate anion and combinations thereof.

A twenty-second example according to the nineteenth example, wherein the acidity source is selected from: succinic acid; citric acid; and combinations thereof.

A twenty-third example according to any one of the nineteenth through twenty-second examples, wherein the acidity source is present at from about 0.5% to about 60%, from about 1% to about 55%, from about 2% to about 50% or from about 5% to about 40%, or from about 8% to about 30%, by weight percentage of the hard surface treatment powder.

A twenty-fourth example according to any one of the preceding examples, further comprising a flow/anticaking agent.

A twenty-fifth example according to the twenty-fourth example wherein the flow/anticaking agent is selected from: precipitated, milled, amorphous or fumed silica (e.g., Sipernat® D13, Sipernat® 340, Sipernat® 50S, Zeofree® 5161, Zeofree® 600, Aerosil® R 972 from Evonik Industries (Essen, Germany), Syloid® 244, Syloid® AL-1, Perkasil® SM500F, Perkasil® SM660 from W. R. Grace & Co. (Columbia, Md.)); magnesium stearate; calcium stearate; modified starches; cellulose and cellulose derivatives (hydroxypropyl methylcellulose, carboxymethyl cellulose etc.); clays; zeolite; and combinations thereof.

A twenty-sixth example according to either one of the twenty-fourth or twenty-fifth examples, wherein the flow/anticaking agent is present at from about 0.01% to about 2%, from about 0.03% to about 1.5%, from about 0.05% to about 1.0%, or from about 0.05% to about 0.8% by weight of the hard surface treatment powder.

A twenty-seventh example according to any one of the preceding examples, further comprising one or more colorants selected from: dye, pigment and mixtures thereof.

A twenty-eighth example according to the twenty-seventh example, wherein the colorant is a pigment selected from: organic pigment, inorganic pigment and mixtures thereof.

A twenty-ninth example according to the twenty-eighth example, wherein the pigment is an organic pigment selected from: azo pigments (e.g., condensed and/or chelate azo pigments); thiazoles; polycyclic pigments (e.g., phthalocyanines; anthraquinones (e.g., alizarin); quinacridones; thioindigoids; isoindolinones; and/or quinophthalones) and combinations thereof.

A thirtieth example according to the twenty-eighth example, wherein the pigment is an inorganic pigment selected from: black pigments (e.g., carbon black); iron-oxide earth pigments (e.g., hematite; hydroxide goethite; iron oxides; manganese oxides; and combinations thereof); chromium pigments (e.g., chromium oxide); cadmium pigments; metallic pigments; iron blue; and combinations thereof.

A thirty-first example according to the twenty-seventh example, wherein the pigment is selected from: Pigment Blue 29; Direct Yellow 28; LX-8939 Permanent Aquamarine; Pylam Dark Violet LX-11400 from Orco (Lincoln, R. I.); Orcoperm AG Ultramarine Blue from Orco (Lincoln, R. I.); and combinations thereof.

A thirty-second example according to the twenty-seventh example, wherein the dye is selected from: azo dyes; thiazine dyes; anthraquinone dyes; polyalkyleneoxy based polymeric dyes; and combinations thereof. Exemplary species of dyes of use may be selected from: C.I. Basic Orange 2; FD&C Red #40; C.I. Disperse Blue 156; C.I. Disperse Blue 148; Acid Red 37; Acid Orange 52; Disperse Blue 106; Basic Blue 24; Basic Green 5; Liquitint® Blue HP from Milliken Chemical (Spartanburg, S. C.); Liquitint Blue MC from Milliken Chemical (Spartanburg, S. C.); Liquitint Violet 129 from Milliken Chemical (Spartanburg, S. C.); D&C Red #28; Pylaklor Dark Blue LX-9442 from Pylam Dyes™ (Tempe, Ariz.); Pylaklor LX-8939 Permanent Aqua from Pylam Dyes™ (Tempe, Ariz.); and combinations thereof.

A thirty-third example according to any one of the twenty-seventh through thirty-second examples, wherein the one or more colorants are present at from about 0.0001 wt. % to about 1 wt. %, from about 0.001 wt. % to about 0.7 wt. %, from about 0.005 wt. % to about 0.6 wt. %, or from about 0.05 wt. % to about 0.5 wt. %, by weight percentage of the hard surface treatment powder.

A thirty-fourth example according to any one of the preceding examples, further comprising chelating agent.

A thirty-fifth example according to the thirty-fourth example, wherein the chelating agent is selected from: ethylenediaminetetraacetic acid ("EDTA"); EDTA derivatives; 8-hydroxyquinoline; N,N-dicarboxymethyl glutamic acid ("GLDA"); GLDA derivatives; N-(2-Hydroxyethyl) ethylenediaminetriacetic acid ("HEDTA"); ethanoldiglycinic acid ("EDG"); methylglycinediacetic acid (MGDA); glucoheptonic acid; pyrophosphoric acid; hypophosphorous acid; tripolyphosphoric acid; citric acid; phosphonic acid; polyamino phosphonic acid; the respective sodium salts of any of the foregoing chelating agents; the respective potassium salts of any of the foregoing chelating agents; and combinations thereof.

A thirty-sixth example according to either one of the thirty-fourth and thirty-fifth examples, comprising chelating agent selected from: phosphonic acids; and polyamino phosphonic acids (e.g., 1-hydroxyethilidene 1,1-diphosphonic acid; aminotris (methylenephosphonic acid); and combinations thereof)); diethylenetriamine penta(methylene phosphonic acid); bi s(hexamethylene triamine penta(methylenephosphonic acid)); ethylidenediamine tris(methylene phosphonic acid); hexamethylenediamine tetra(methylene phosphonic acid); the respective sodium salts of any of the foregoing chelating agents; the respective potassium salts of any of the foregoing chelating agents; and combinations thereof.

A thirty-seventh example according to any one of the thirty-fourth through thirty-sixth examples, comprising by weight percentage of the hard surface treatment powder, one or more chelating agents in a total amount of from about 0.1 wt. % to about 10 wt. %, 0.1 wt. % to about 15 wt. %, from about 0.5 wt. % to about 13 wt. %, from about 1 wt. % to about 10 wt. %, from about 1% to about 5%, or from about 1% to about 7% of the ambient moisture-activated STPs.

A thirty-eight example according to any one of the first through ninth examples, wherein the hard surface treatment powder is substantially free of one or more bicarbonate salts.

A thirty-ninth example according to any one of the first through thirty-fourth examples, wherein the hard surface treatment powder is substantially free of: EDTA; EDTA derivatives; HEDTA; HEDTA derivatives; and mixtures thereof.

A fortieth example according to any one of the first through thirty-third examples, wherein the hard surface treatment powder is substantially free of chelating agent(s).

A forty-first example according to any one of the preceding examples, wherein the hard surface treatment powder is substantially free of anionic surfactant and/or substantially free of cellulosic components.

A first example of a method of treating a hard surface, the method comprising applying a hard surface treatment powder according to any one of the preceding examples to a hard surface.

A second example method according to the first example method, further comprising: cleaning the surface; sanitizing the surface; disinfecting the surface; sterilizing the surface; and combinations thereof.

A third example method according to either one of the first or second example methods, wherein the hard surface is: in a food processing facility; in a beverage processing facility; in a dairy; in an animal or human health care facility; on a poultry farm; or on a swine farm.

A fourth example method according to either one of the first through third example methods, wherein the hard surface is selected from: food contact surfaces; a floor (including in cracks and crevices), dispensed into foot pans or on floor mats, used in entryways into buildings (e.g. in plants, warehouses, dairies), used in, around and/or on drain surfaces, used as intervention between rooms (e.g., between warehouse spaces and processing spaces), used in, on and/or around trash/waste receptacles, in and/or around construction barriers, in, on and/or around animal premises (e.g., poultry and swine premises) and anywhere else where a hard surface to be disinfected/sanitized is located.

A fifth example method according to either one of the first through fourth example methods, excluding steps selected from the group consisting of: purposefully adding liquid to the surface treatment powder; purposefully adding liquid to the surface prior to applying the surface treatment powder to the surface; purposefully adding liquid to the surface after applying the surface treatment powder to the surface; and combinations thereof.

A sixth example method according to either one of the first through fifth example methods, wherein the surface to be treated is footwear, the method further comprising placing the surface treatment powder in a foot pan.

A seventh example method according to the sixth example method, further comprising replacing the powder in the foot pan about every four to about every 12 weeks.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

I claim:

1. A hard surface treatment powder comprising:
   (a) a peroxide source that is present in the hard surface treatment powder at from about 1% to about 30% by weight percentage of the hard surface treatment powder;
   (b) an acyl group donor; and
   (c) an alkalinity source;
   wherein the hard surface treatment powder:
   1) is flowable;
   2) is ambient moisture activatable at a relative humidity of at least about 5%;
   3) is substantially free of one or more positively charged surface active agents; and
   4) has a pH of from about 7 to about 10.5, wherein the hard surface treatment powder is formulated to maintain the pH when dissolved in whole or in part by water.

2. The hard surface treatment powder of claim 1, wherein the hard surface treatment powder is substantially free of an anionic surfactant.

3. The hard surface treatment powder of claim 1, further comprising an acidity source.

4. The hard surface treatment powder of claim 3, wherein the alkalinity source is sodium bicarbonate, and the acidity source is citric acid.

5. The hard surface treatment powder of claim 1, wherein the peroxide source is selected from: percarbonate salt; perborate salt; perphosphate salt; persulfate salt; persilicate salt; peroxide salt; peracetate salt; and mixtures thereof.

6. The hard surface treatment powder of claim 1, comprising by weight percentage of the hard surface treatment powder from about 0.5% to about 15% of the acyl group donor, wherein the acyl group donor comprises one or more compounds having acyl groups selected from: an O-acyl moiety; an N-acyl moiety; both an O-acyl and N-acyl moiety; and mixtures thereof.

7. The hard surface treatment powder of claim 1, further comprising by weight percentage of the hard surface treatment powder from about 0.001% to about 7% of a binder selected from: polyethylene glycol having an average molecular weight of from about 200 to about 1,000 g/mol; an EO-PO block copolymer having an HLB of from about 2 to about 9; a non-ionic surfactant that is insoluble in DI water at above 1% w/vol; and combinations thereof.

8. The hard surface treatment powder of claim 1, further comprising a flow/anticaking agent selected from: silica; magnesium stearate; calcium stearate; modified starches; cellulose; cellulose derivatives; clays; zeolite; and combinations thereof.

9. The hard surface treatment powder of claim 1, further comprising a colorant selected from: a dye; a pigment; and combinations thereof.

10. The hard surface treatment powder of claim 1, further comprising by weight percentage of the hard surface treatment powder from about 0.1% to about 10% of a chelating agent selected from: ethylenediaminetetraacetic acid ("EDTA"); EDTA derivatives; 8-hydroxyquinoline; N,N-dicarboxymethyl glutamic acid ("GLDA"); GLDA derivatives; N-(2-hydroxyethyl)ethylenediaminetriacetic acid; ethanoldiglycinic acid; methylglycinediacetic acid (MGDA); glucoheptonic acid; pyrophosphoric acid; hypophosphorous acid; tripolyphosphoric acid; citric acid; phosphonic acid; polyamino phosphonic acid; the respective sodium salts of any of the foregoing acidity sources; the respective potassium salts of any of the foregoing chelating agents; and combinations thereof.

11. The hard surface treatment powder of claim 1, further comprising by weight percentage of the hard surface treatment powder from about 0.1% to about 10% of a chelating agent selected from: phosphonic acids; and polyamino phosphonic acids; polyamino phosphonic acids; diethylenetriamine penta(methylene phosphonic acid); bis(hexamethylene triamine penta(methylenephosphonic acid)); ethylidenediamine tris(methylene phosphonic acid); hexamethylenediamine tetra(methylene phosphonic acid); the respective sodium salts of any of the foregoing chelating agents; the respective potassium salts of any of the foregoing chelating agents; and combinations thereof.

12. The hard surface treatment powder of claim 1, wherein the hard surface treatment powder is substantially free of a chelating agent.

13. The hard surface treatment powder of claim 1, wherein the hard surface treatment powder is substantially free of sodium bicarbonate.

14. The hard surface treatment powder of claim 1, wherein the one or more positively charged surface active agents are quaternary ammonium compounds.

15. A quat free, flowable hard surface treatment powder comprising:
(a) from about 1% to about 30% by weight percentage of the hard surface treatment powder of a peroxide source selected from: percarbonate salt; perborate salt; perphosphate salt; persulfate salt; persilicate salt; peroxide salt; peracetate salt; and combinations thereof;

(b) from about 0.5% to about 15% by weight percentage of the hard surface treatment powder of an acyl group donor selected from: tetraacetylethylenediamine; sodium nonanoyloxybenzenesulfonate; and combinations thereof;
(c) an alkalinity source; and
(d) from about 0.1% to about 5.0% by weight percentage of the hard surface treatment powder of a binder selected from: polyethylene glycol having an average molecular weight of from about 200 to about 1,000 g/mol; an EO-PO block copolymer having an HLB of from about 2 to about 9; a non-ionic surfactant that is insoluble in DI water at above 1% w/vol; and combinations thereof;
wherein the hard surface treatment powder has a pH of about 7.0 to about 10.5 when dissolved in whole or in part in water and further wherein the hard surface treatment powder is ambient moisture activatable at a relative humidity of at least about 5%.

16. The hard surface treatment powder of claim 15, wherein the hard surface treatment powder has a pH of about 8.0 to about 9.8 when dissolved in whole or in part in water.

17. The hard surface treatment powder of claim 15, wherein the hard surface treatment powder is substantially free of anionic surfactant.

18. The hard surface treatment powder of claim 15, further comprising a flow/anticaking agent selected from: silica; magnesium stearate; calcium stearate; modified starches; cellulose; cellulose derivatives; clays; zeolite; and combinations thereof.

19. The hard surface treatment powder of claim 17, comprising by weight percentage of the hard surface treatment powder from about 0.01% to about 2% of the flow/anticaking agent.

20. A method of treating a hard surface, the method comprising applying to the hard surface a hard surface treatment powder comprising:
(a) a peroxide source that is present in the hard surface treatment powder at from about 1% to about 30% by weight percentage of the hard surface treatment powder;
(b) an acyl group donor; and
(c) an alkalinity source;
wherein the hard surface treatment powder:
1) is flowable;
2) is ambient moisture activatable at a relative humidity of at least about 5%;
3) is substantially free of one or more positively charged surface active agents; and
4) has a pH of from about 7 to about 10.5, wherein the hard surface treatment powder is formulated to maintain the pH when dissolved in whole or in part by water.

21. The method of claim 20, wherein the surface to be treated is treated is footwear, the method further comprising placing the ambient moisture-activated surface treatment powder in a foot pan.

22. The method of claim 20, wherein the one or more positively charged surface active agents are quaternary ammonium compounds.

* * * * *